(12) United States Patent
Dent

(10) Patent No.: US 9,614,588 B2
(45) Date of Patent: Apr. 4, 2017

(54) SMART APPLIANCES

(71) Applicant: Paul Wilkinson Dent, Pittsboro, NC (US)

(72) Inventor: Paul Wilkinson Dent, Pittsboro, NC (US)

(73) Assignee: Koolbridge Solar, Inc., Wilmington, NC (US)

( * ) Notice: Subject to any disclaimer, the term of this patent is extended or adjusted under 35 U.S.C. 154(b) by 0 days.

(21) Appl. No.: 14/608,207

(22) Filed: Jan. 29, 2015

(65) Prior Publication Data
US 2016/0226560 A1    Aug. 4, 2016

(51) Int. Cl.
*H04B 3/54* (2006.01)
*H04L 12/28* (2006.01)

(52) U.S. Cl.
CPC .......... *H04B 3/54* (2013.01); *H04L 12/2838* (2013.01)

(58) Field of Classification Search
CPC .............. H04B 3/54; H04B 2203/5462; H04B 2203/00; H04B 2203/5429; H02J 3/14; H02J 9/02; H02J 9/005; H02J 9/04; H02J 11/00; H02J 13/00; H02J 15/00; Y02B 70/3225; Y02B 70/3266; Y02B 70/3275; Y04S 20/22; H01H 9/167; H04L 47/10
See application file for complete search history.

(56) References Cited

U.S. PATENT DOCUMENTS

| | | | | |
|---|---|---|---|---|
| 4,433,326 A * | 2/1984 | Howell | ..................... | H04B 3/54 307/3 |
| 5,257,006 A * | 10/1993 | Graham | ................... | H04B 3/54 307/11 |
| 6,144,292 A * | 11/2000 | Brown | ................ | H02J 13/0027 340/12.33 |
| 8,937,822 B2 | 1/2015 | Dent | | |
| 2002/0031098 A1* | 3/2002 | Pfeiffer | ..................... | H04L 1/18 370/282 |
| 2002/0060617 A1 | 5/2002 | Walbeck et al. | | |
| 2002/0110311 A1* | 8/2002 | Kline | ..................... | G02B 6/483 385/15 |
| 2002/0154000 A1* | 10/2002 | Kline | ..................... | G02B 6/483 370/489 |
| 2007/0176723 A1* | 8/2007 | Renz | ........................ | H04B 3/56 336/210 |
| 2008/0007879 A1 | 1/2008 | Zaretsky et al. | | |
| 2008/0316004 A1 | 12/2008 | Kiko | | |
| 2011/0210717 A1 | 9/2011 | Hilton et al. | | |
| 2012/0076050 A1 | 3/2012 | Masuda | | |

(Continued)

FOREIGN PATENT DOCUMENTS

WO    92/16920 A1    10/1992
WO    2008113052 A1    9/2008

*Primary Examiner* — Daniel Washburn
(74) *Attorney, Agent, or Firm* — Coats & Bennett, PLLC

(57) ABSTRACT

Smart Appliances are defined that assist in reducing energy consumption or cost. The Smart Appliances communicate with Smart Energy sources via the power lines and in particular by injecting communications signals between the live plus neutral power lines on the one hand and the ground line on the other hand, the communications protocol allowing a power source to identify the electrical circuit to which an appliance is connected and thereby to route a selected type of power to the appliance on the correct electrical circuit for that appliance.

13 Claims, 22 Drawing Sheets

COMMUNICATION WITH SMART APPLIANCES

(56) References Cited

U.S. PATENT DOCUMENTS

| | | | |
|---|---|---|---|
| 2012/0195355 A1* | 8/2012 | El-Essawy | H04B 3/54 375/222 |
| 2012/0275526 A1 | 11/2012 | Hughes | |
| 2014/0084687 A1 | 3/2014 | Dent | |
| 2014/0088780 A1 | 3/2014 | Chen | |
| 2014/0211345 A1 | 7/2014 | Thompson et al. | |
| 2015/0066231 A1* | 3/2015 | Clifton | H02J 3/32 700/296 |

* cited by examiner

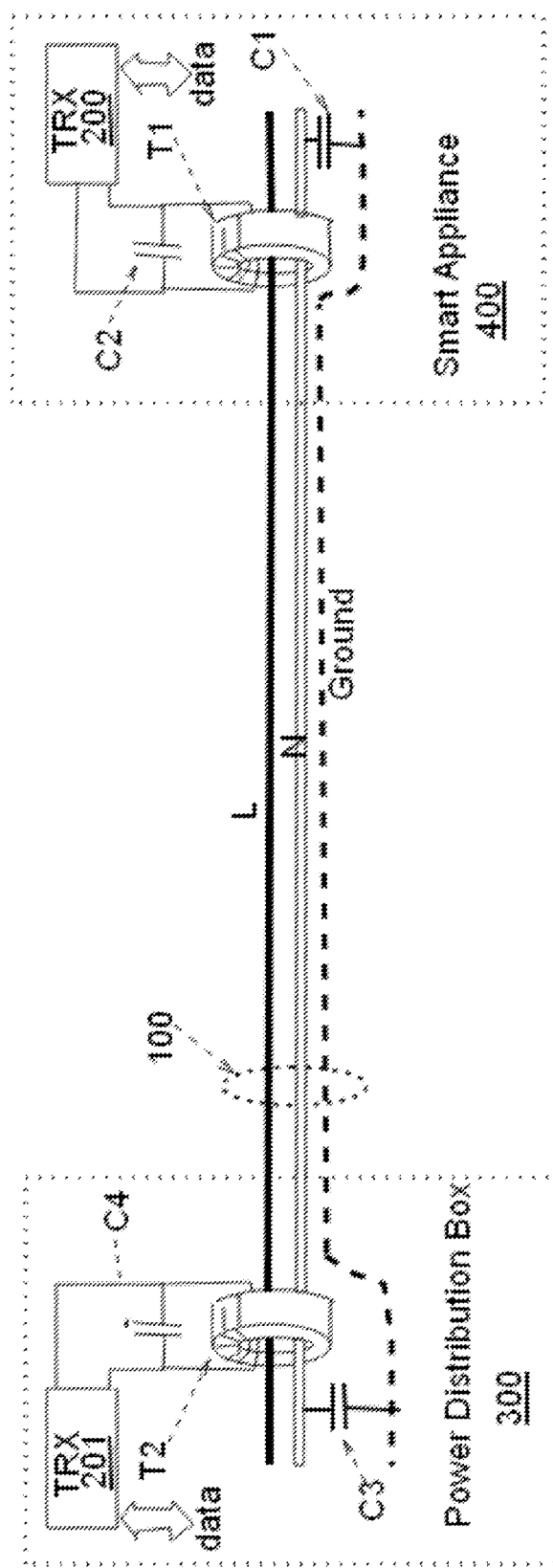
FIGURE 1: COMMUNICATION WITH SMART APPLIANCES

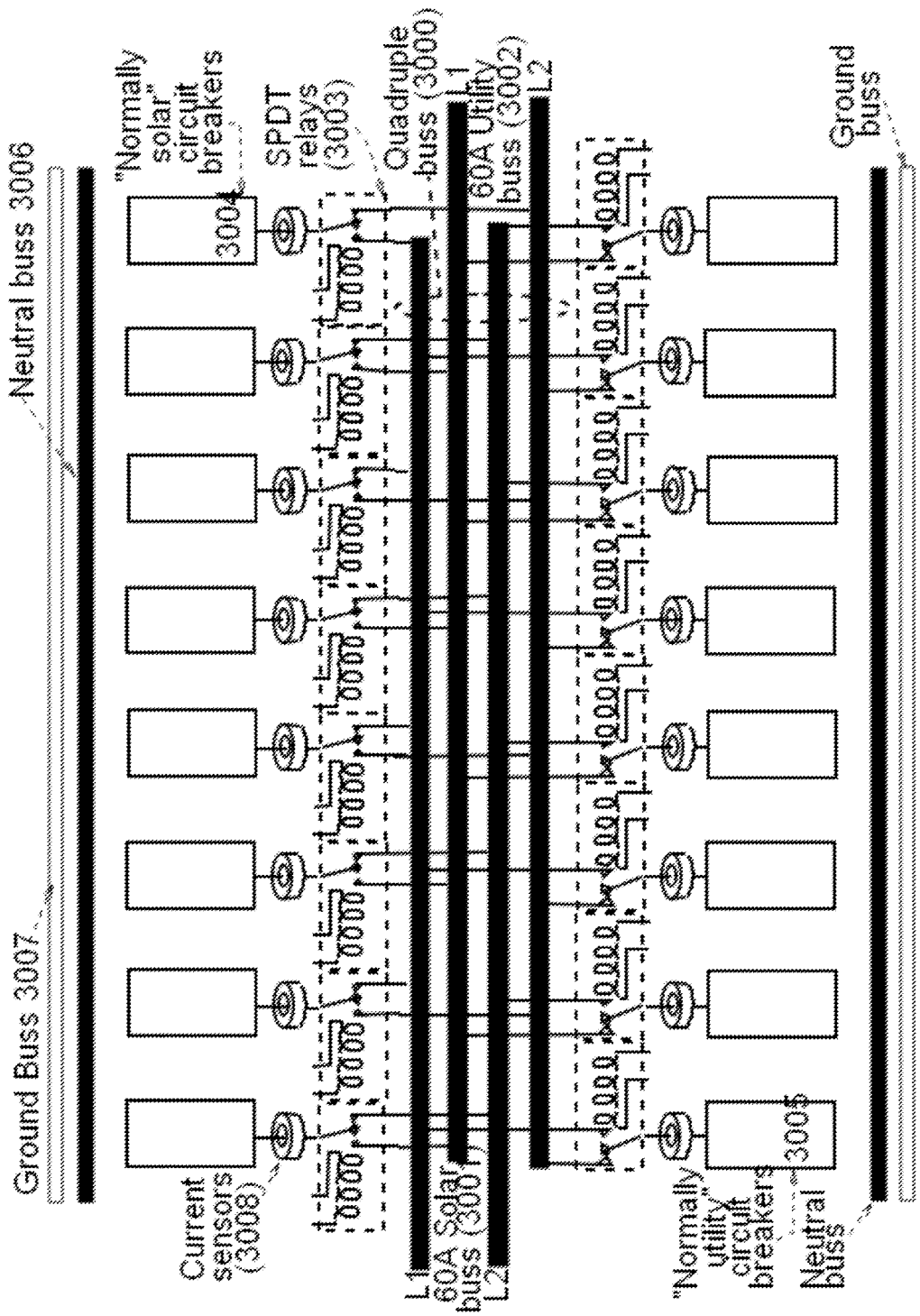

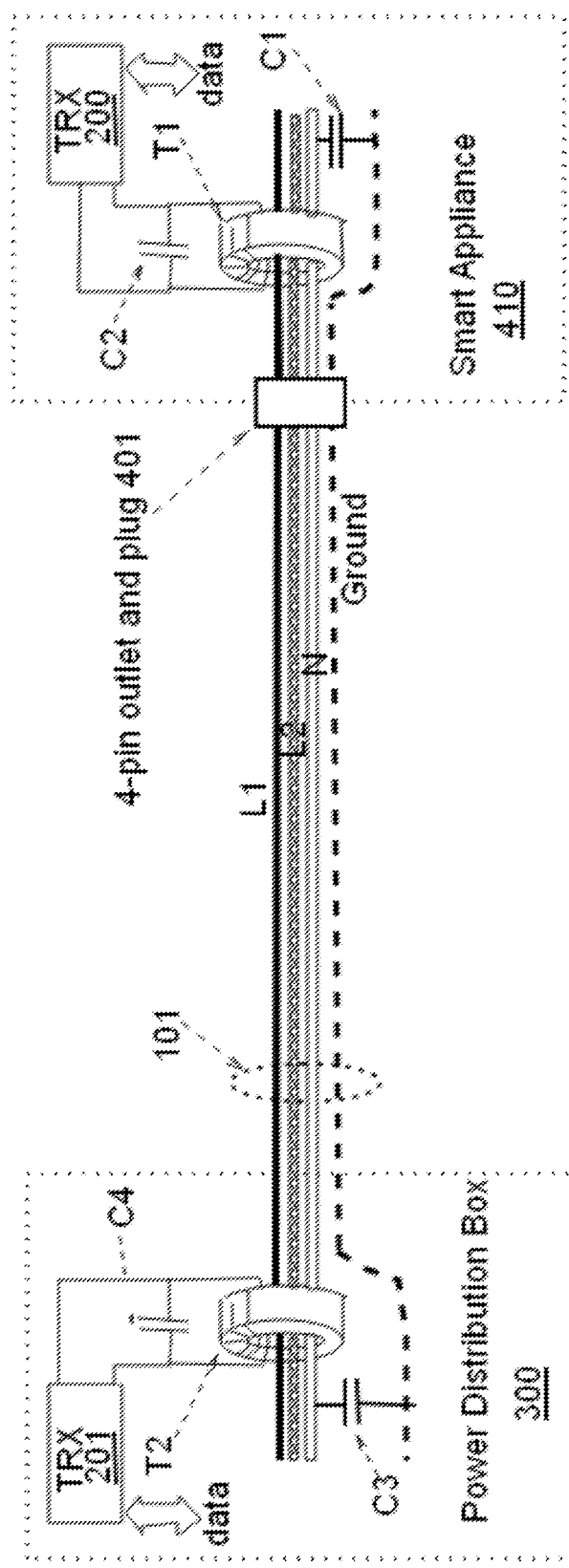
FIGURE 3: COMMUNICATION WITH 240V SMART APPLIANCES

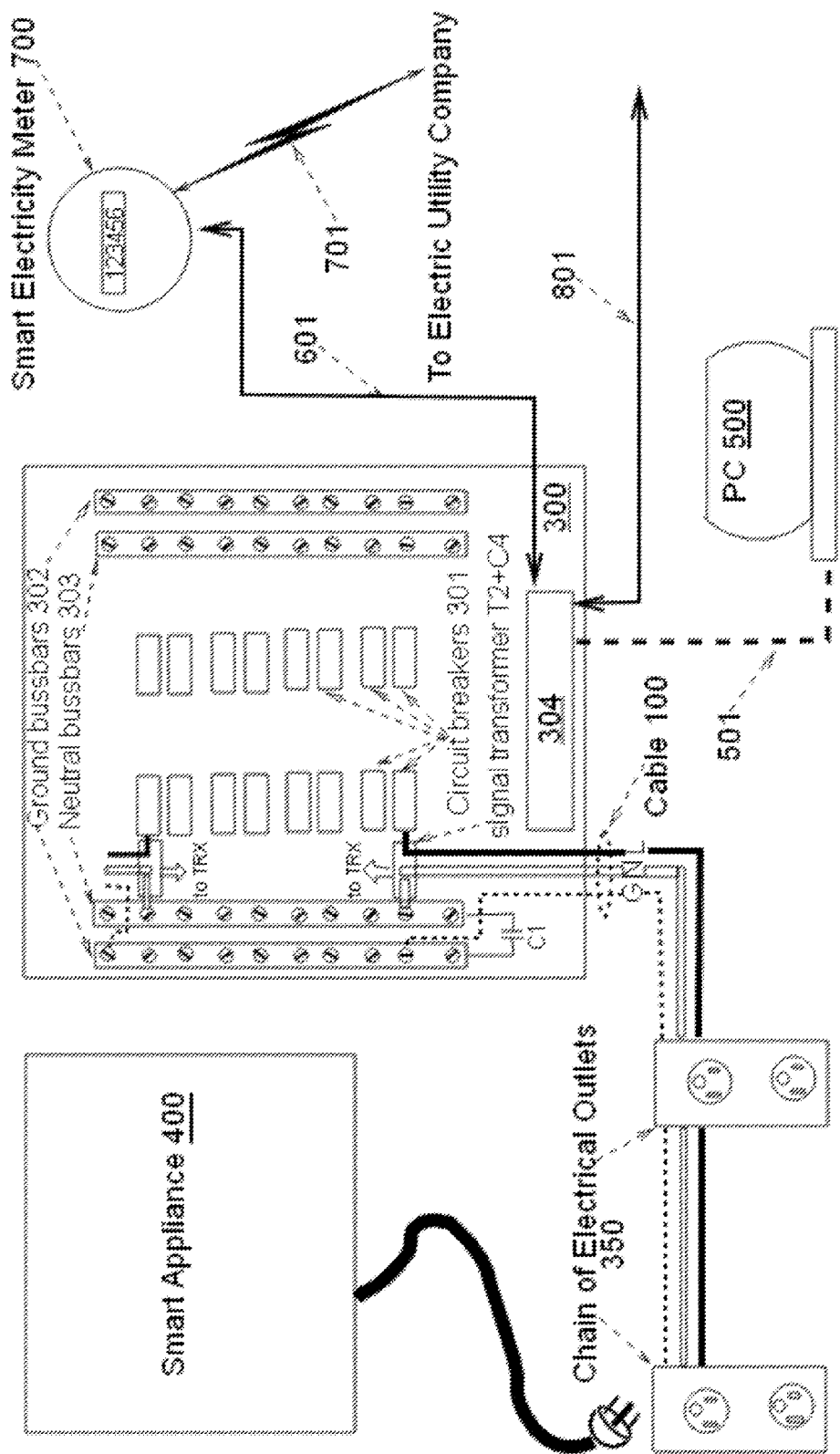

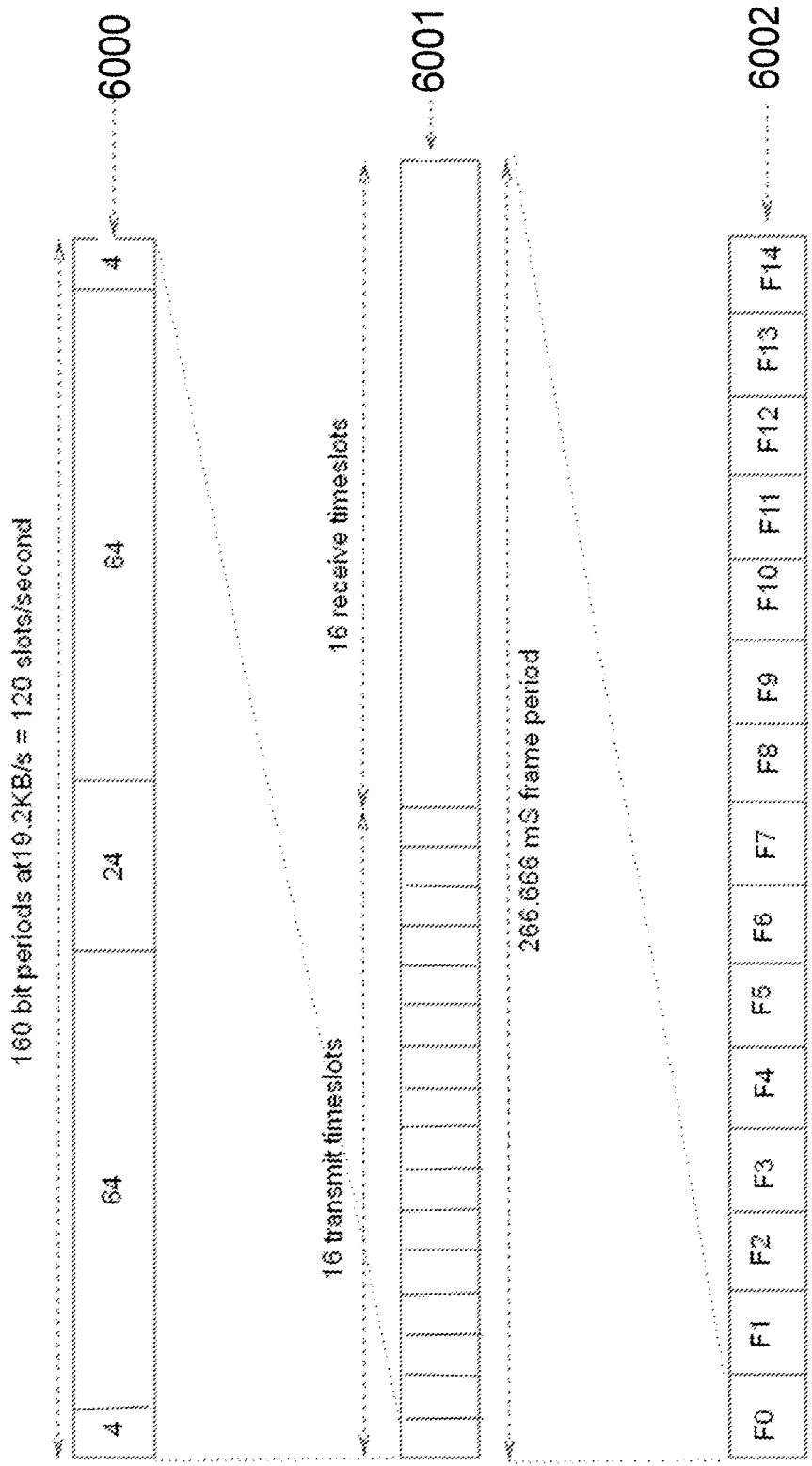
FIGURE 5: A POSSIBLE TIME DIVISION MULTIPLEX FORMAT

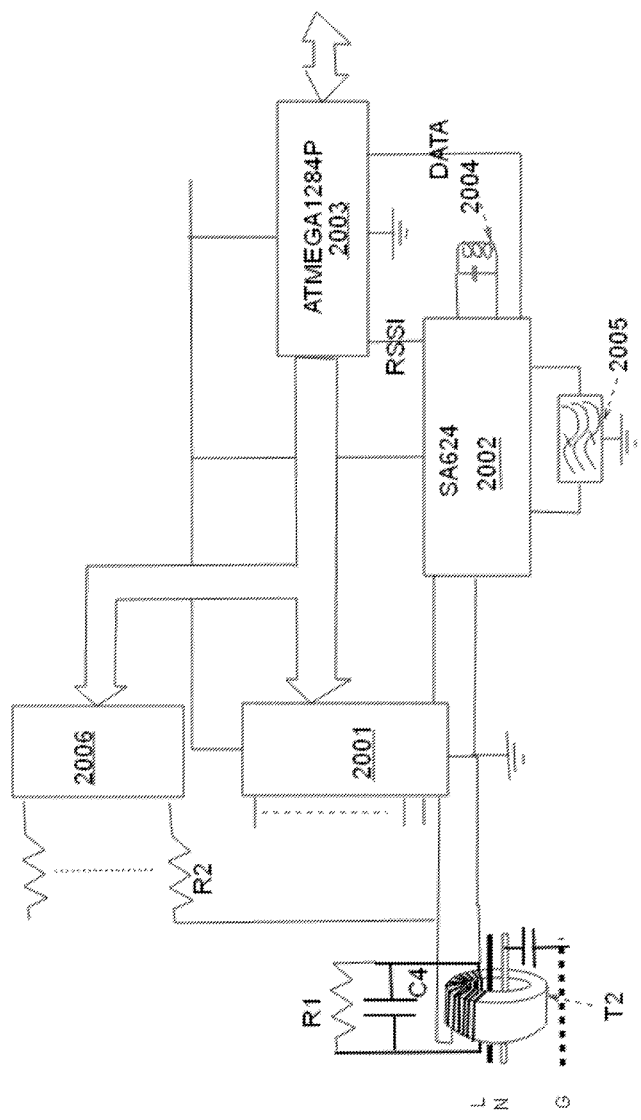
FIGURE 6: A POSSIBLE OUTLINE COMMUNICATIONS CIRCUIT DESIGN

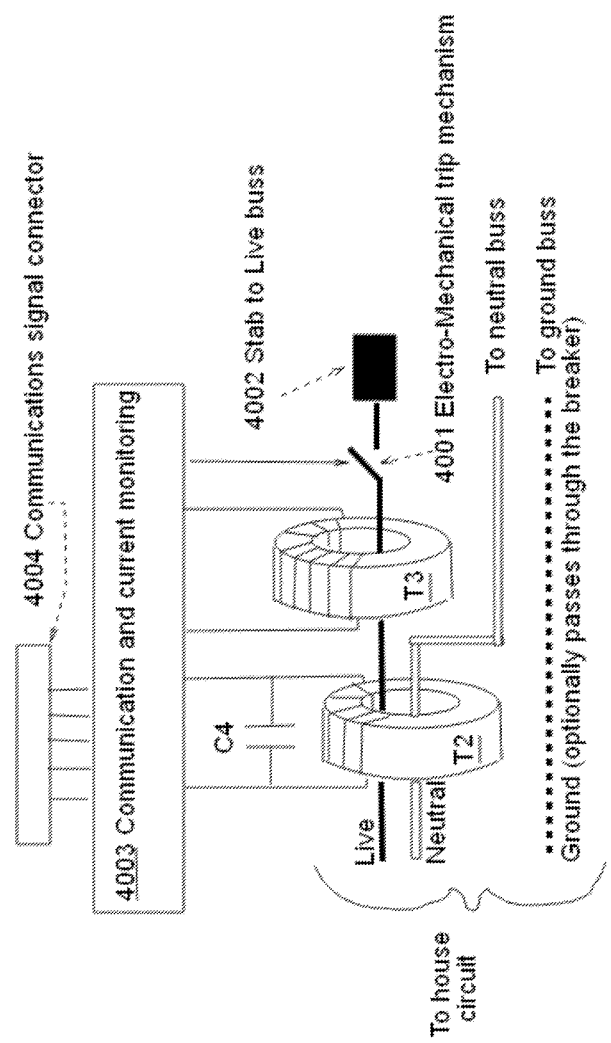
FIGURE 7: A NEW TYPE OF CIRCUIT BREAKER INCORPORATING COMMUNICATIONS

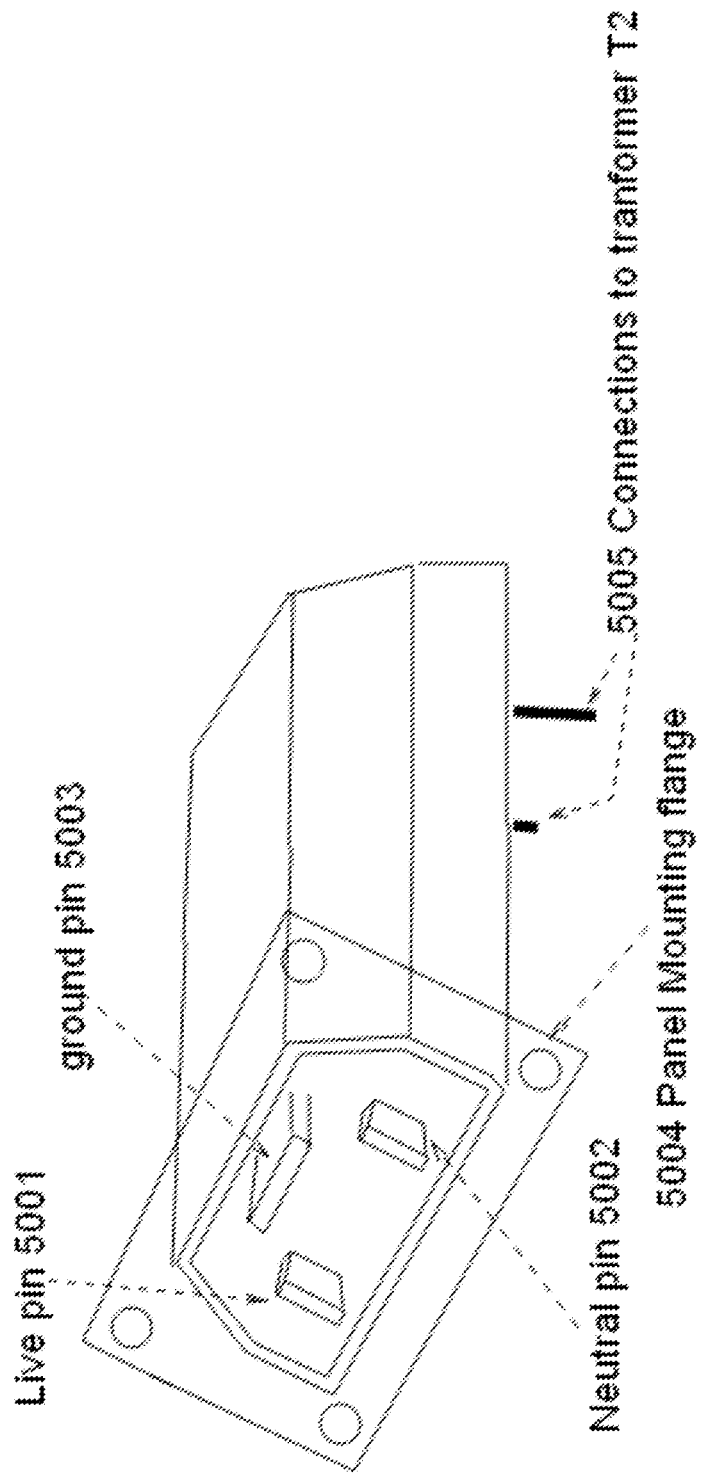

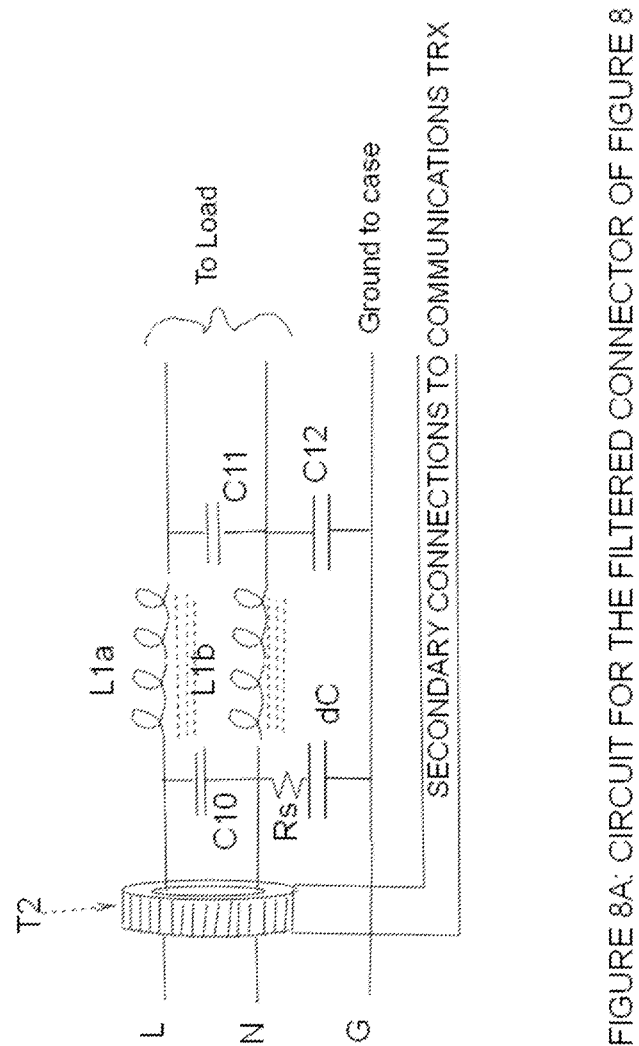
FIGURE 8A: CIRCUIT FOR THE FILTERED CONNECTOR OF FIGURE 8

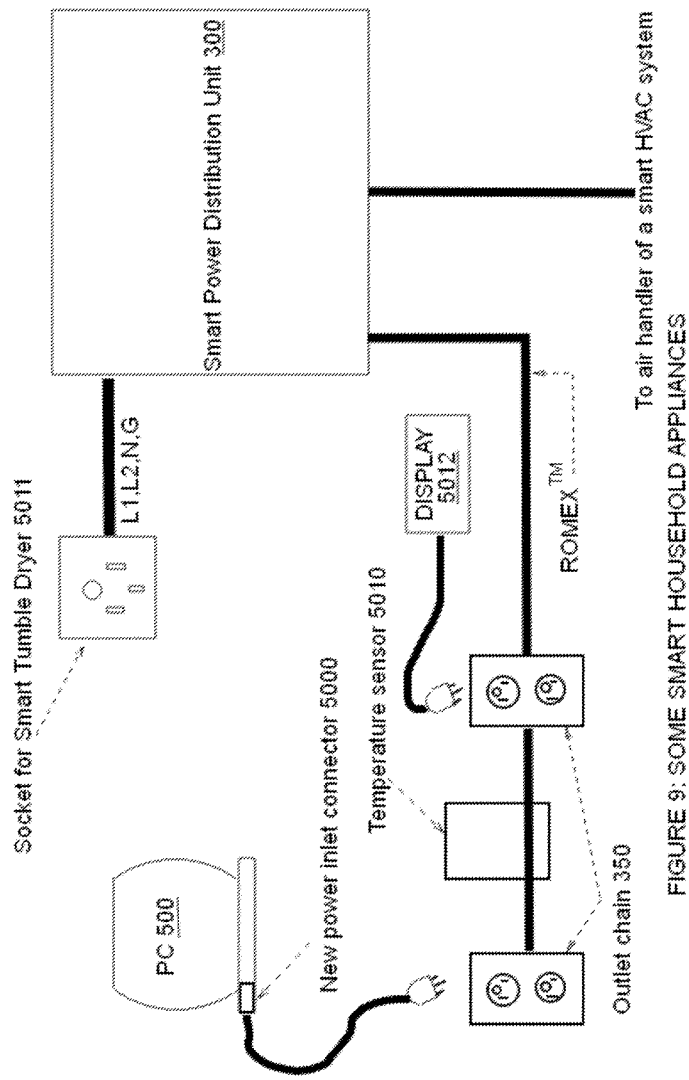
FIGURE 9: SOME SMART HOUSEHOLD APPLIANCES

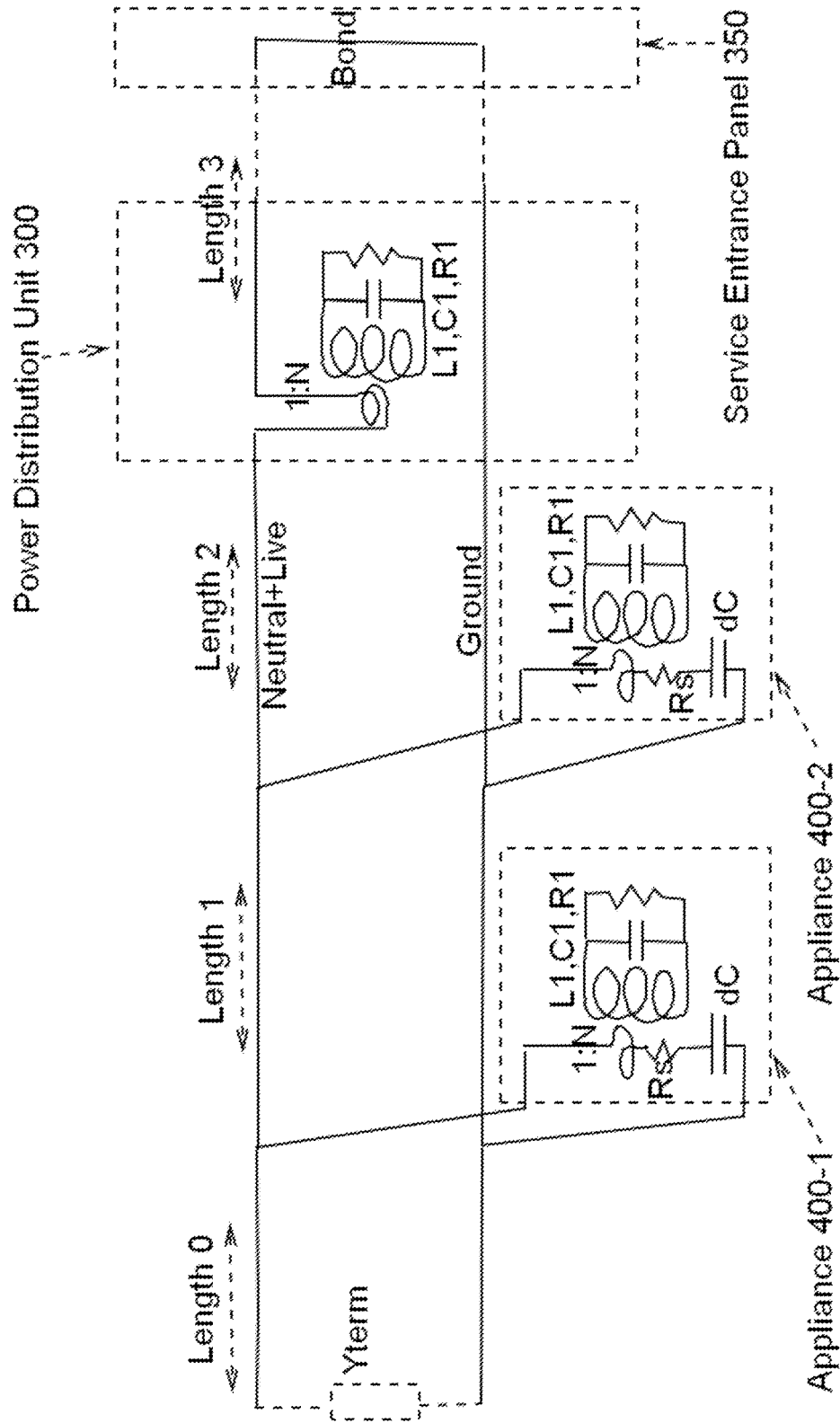
FIGURE 10: CIRCUIT USED FOR TRANSMISSION FREQUENCY RESPONSE ANALYSIS

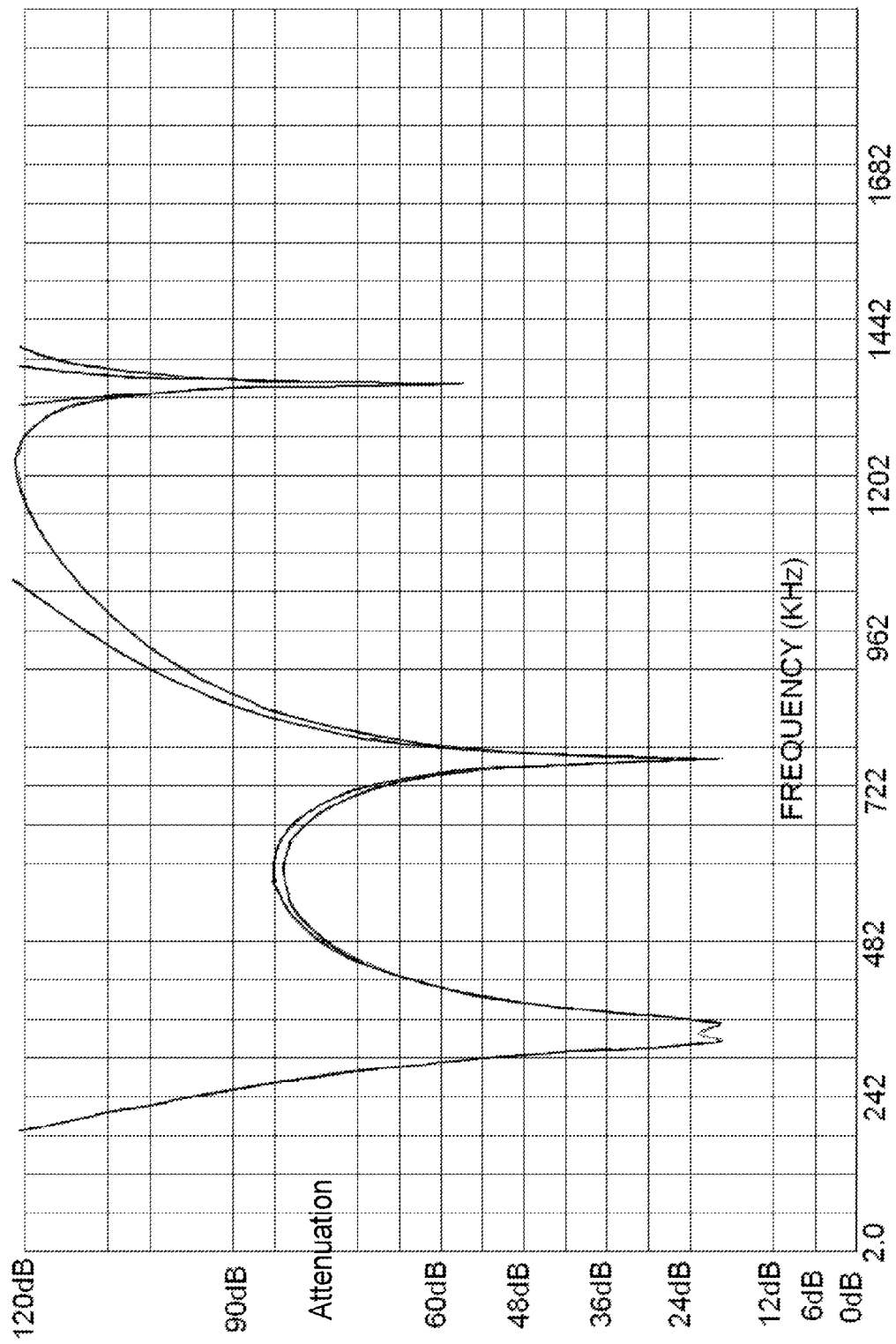

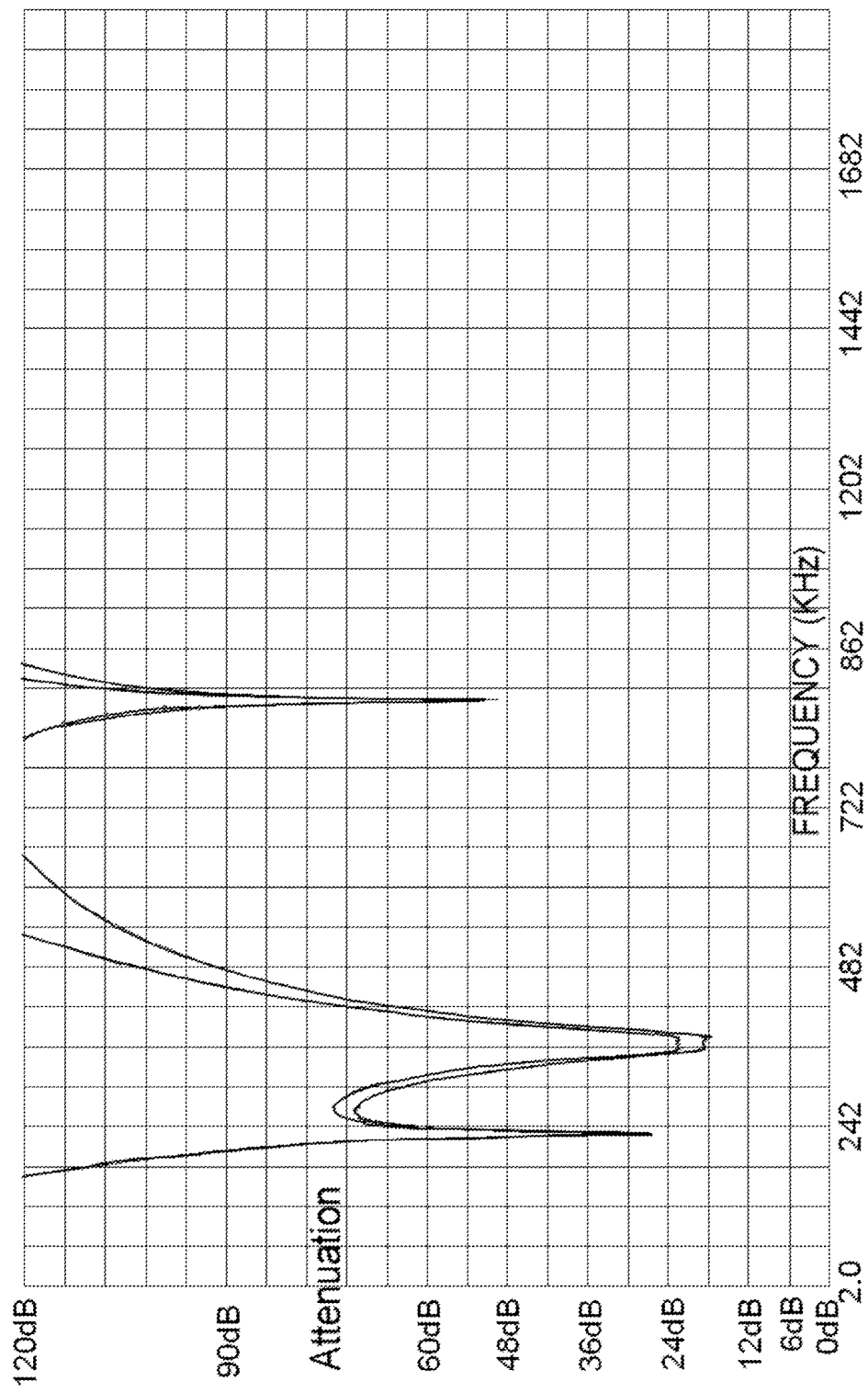
FIGURE 12: WIDE SCAN FREQUENCY RESPONSE (LONG LINES, NO DAMPING)

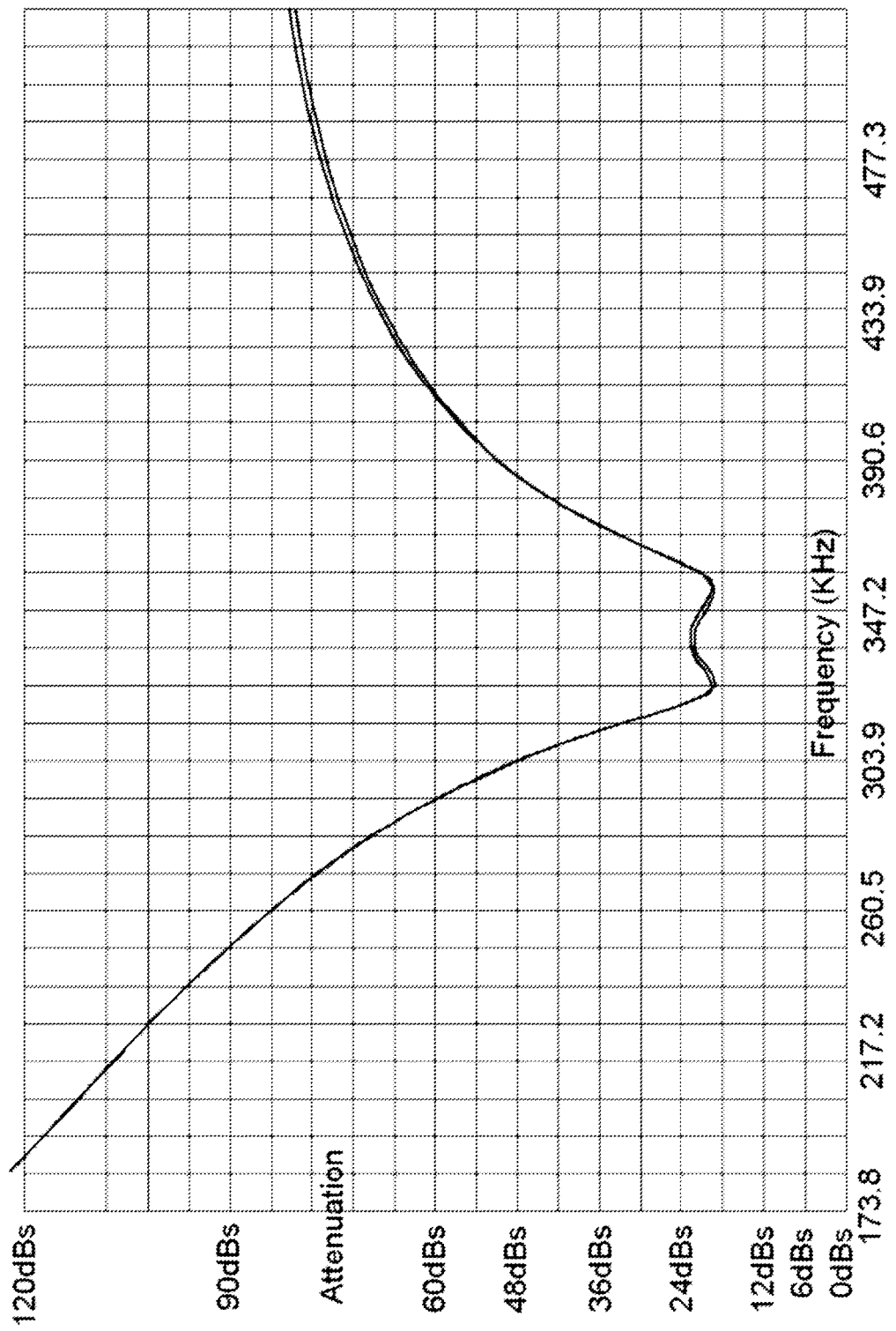

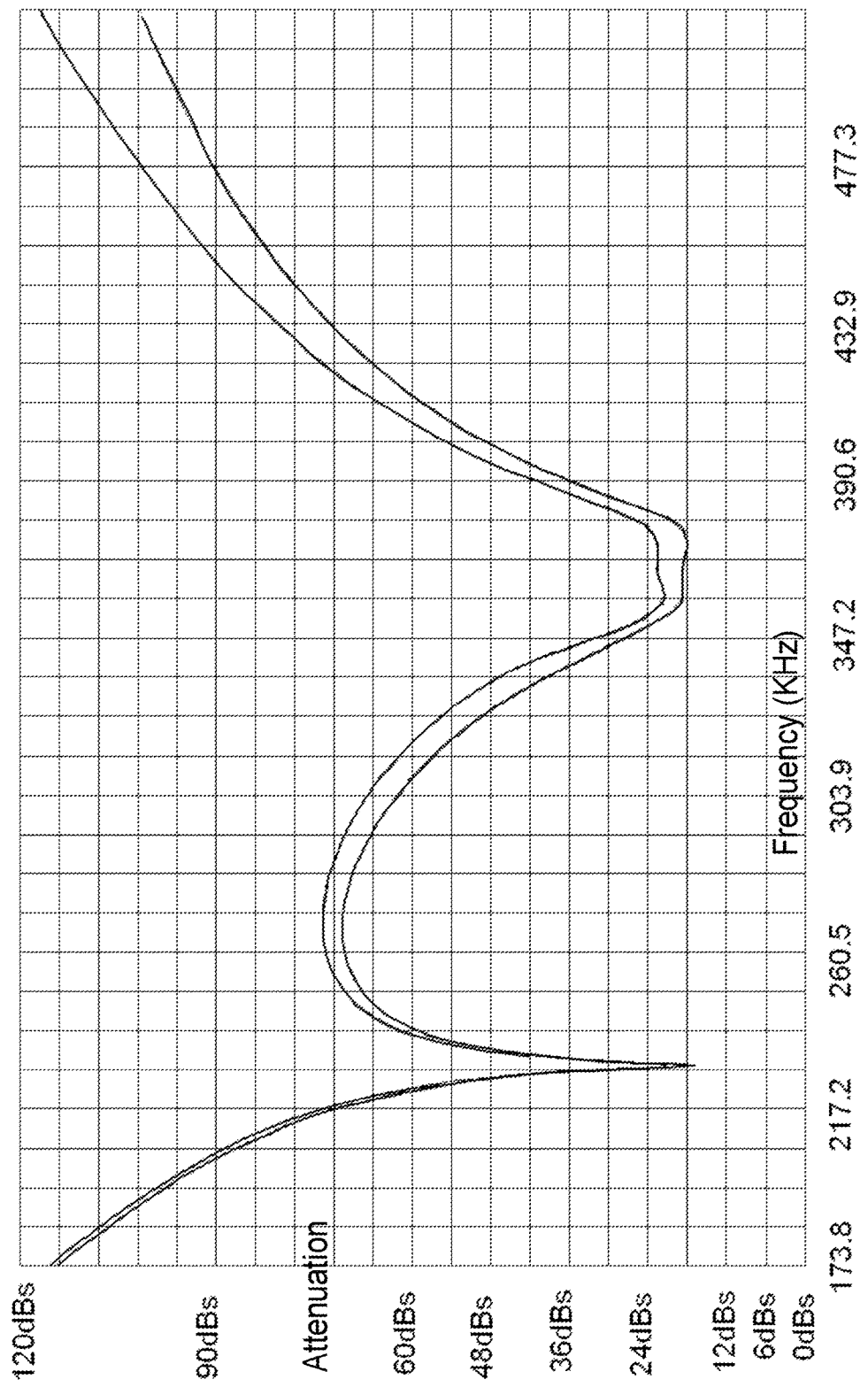
FIGURE 14: PASSBAND FREQUENCY RESPONSE (LONG LINES, NO DAMPING)

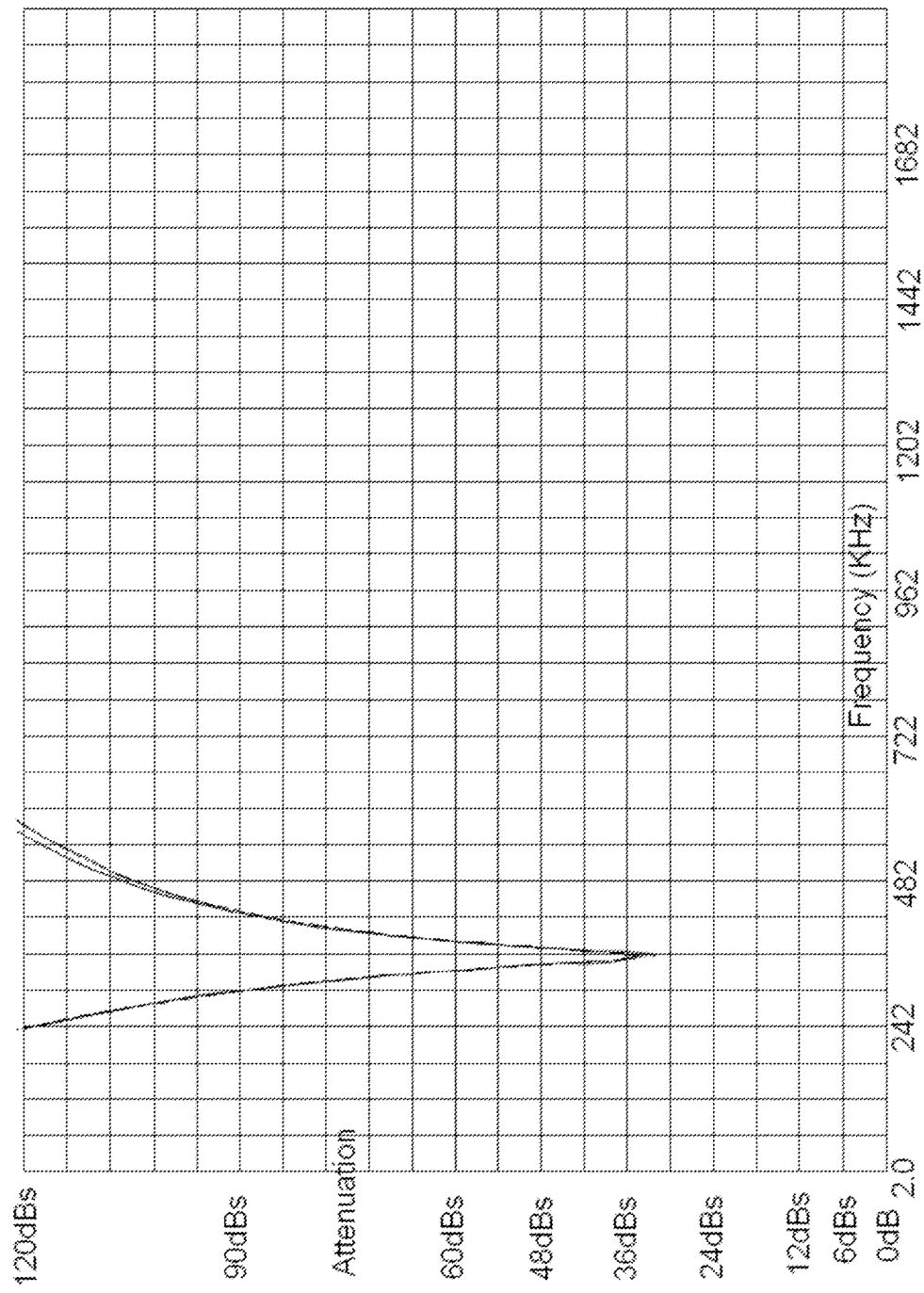
FIGURE 15: WIDE RANGE FREQUENCY RESPONSE (LONG LINES WITH DAMPING)

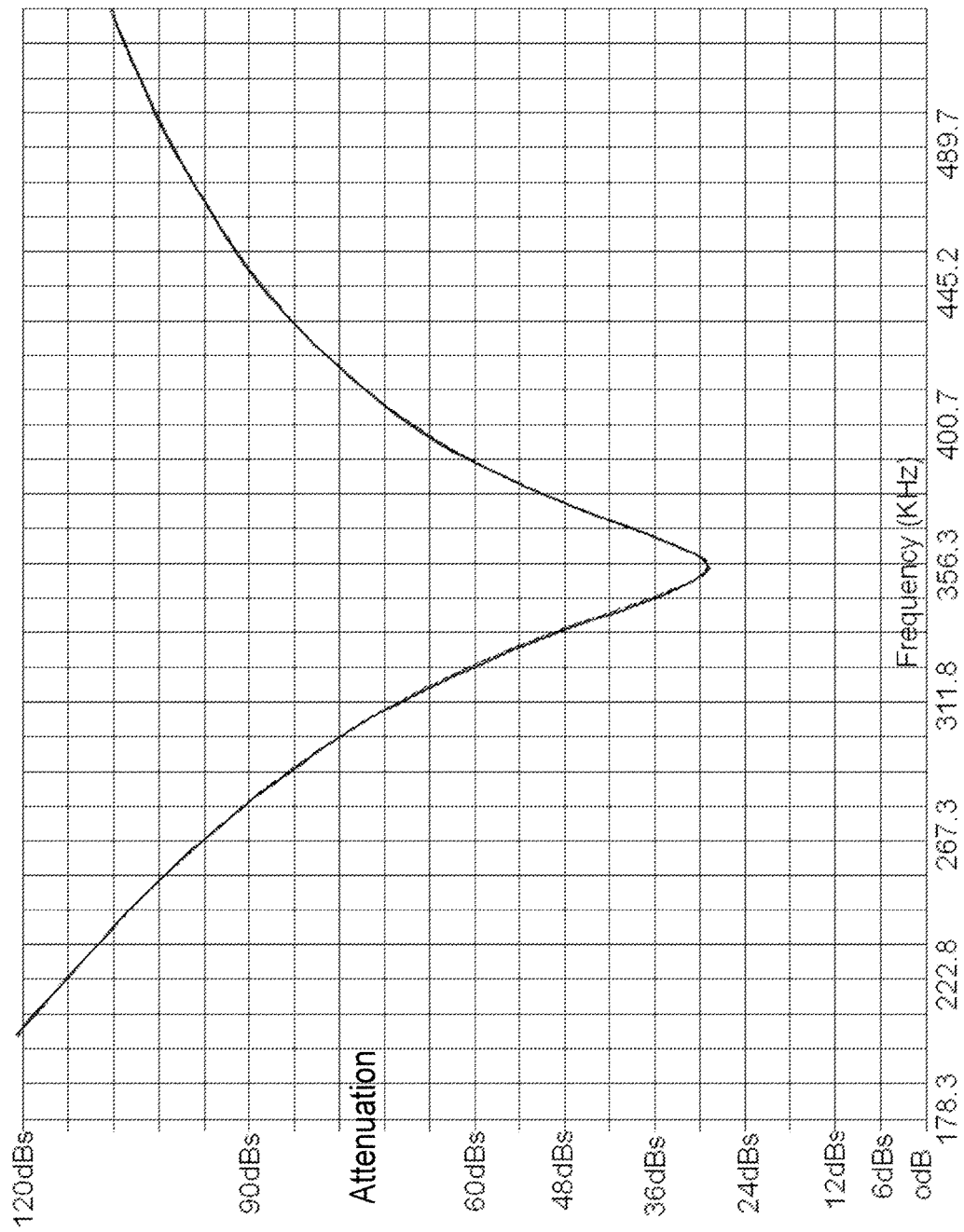

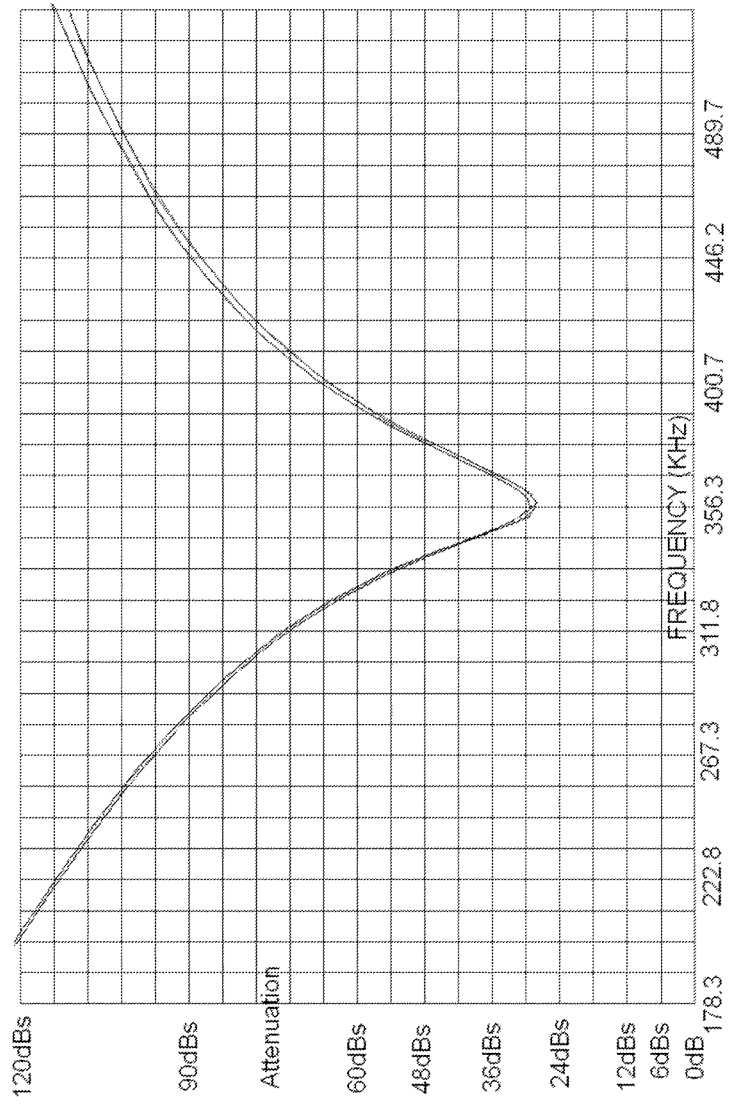

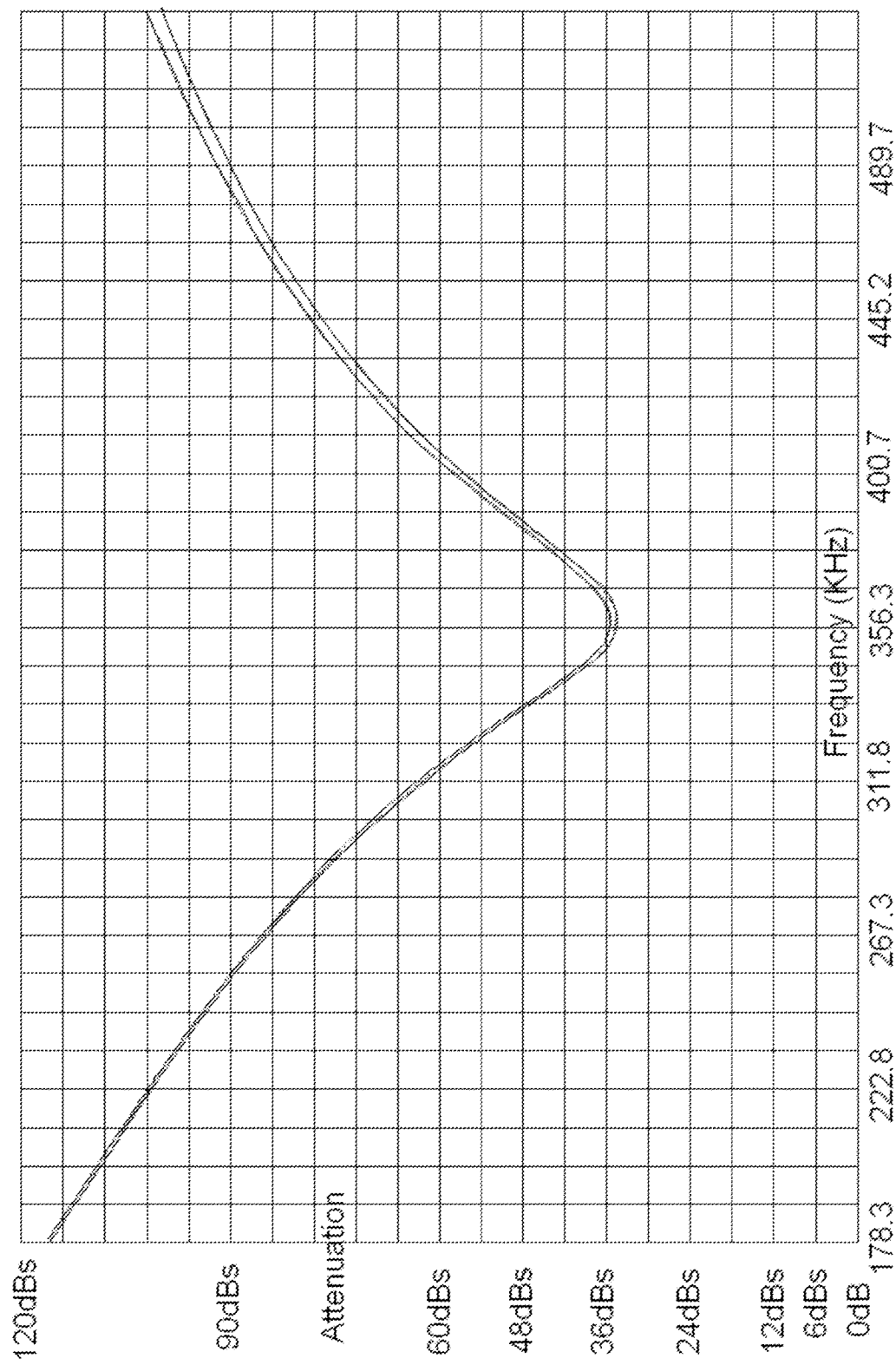
FIGURE 18: PASSBAND FREQUENCY RESPONSE WITH LOWER Q CIRCUIT

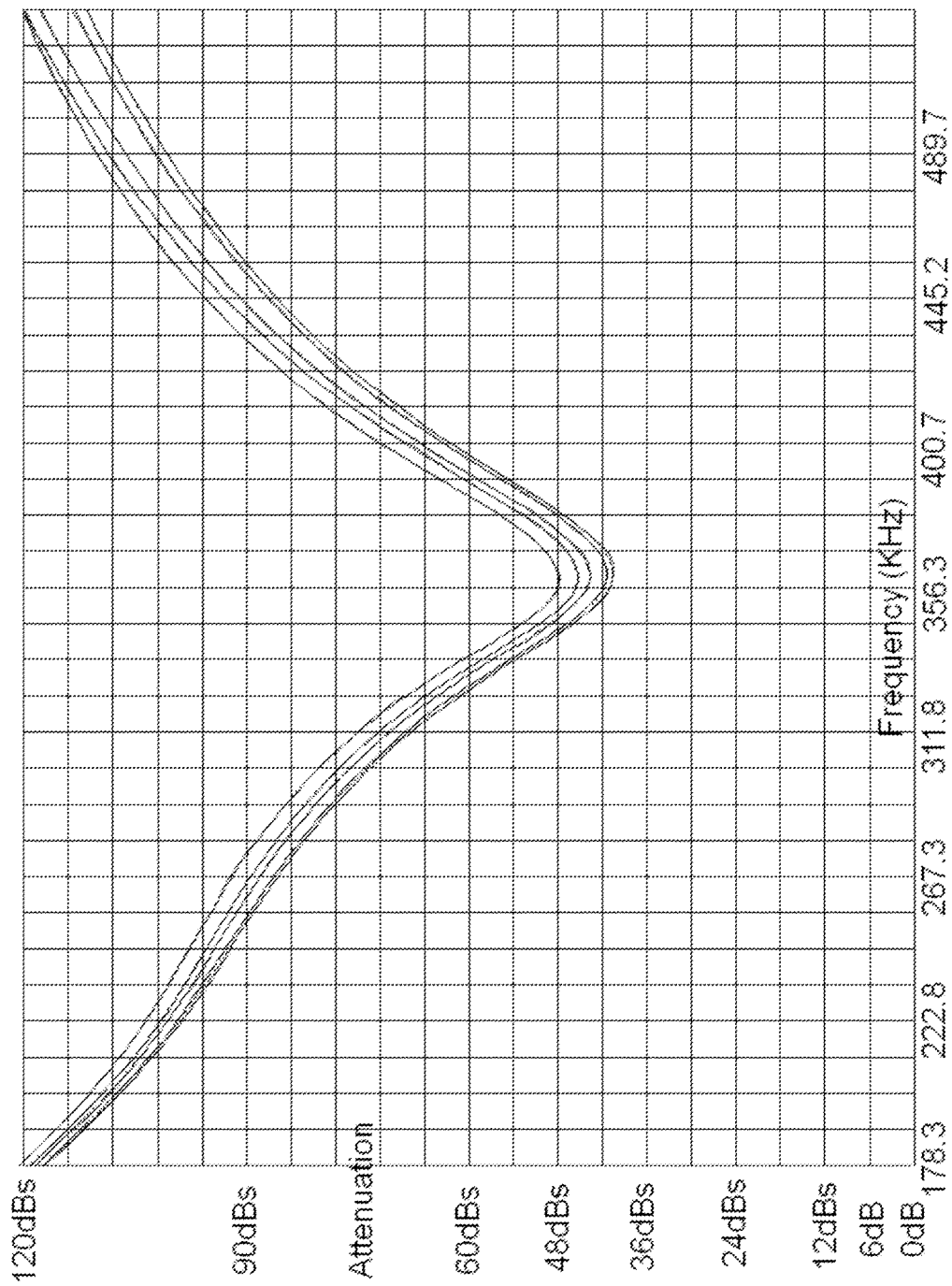

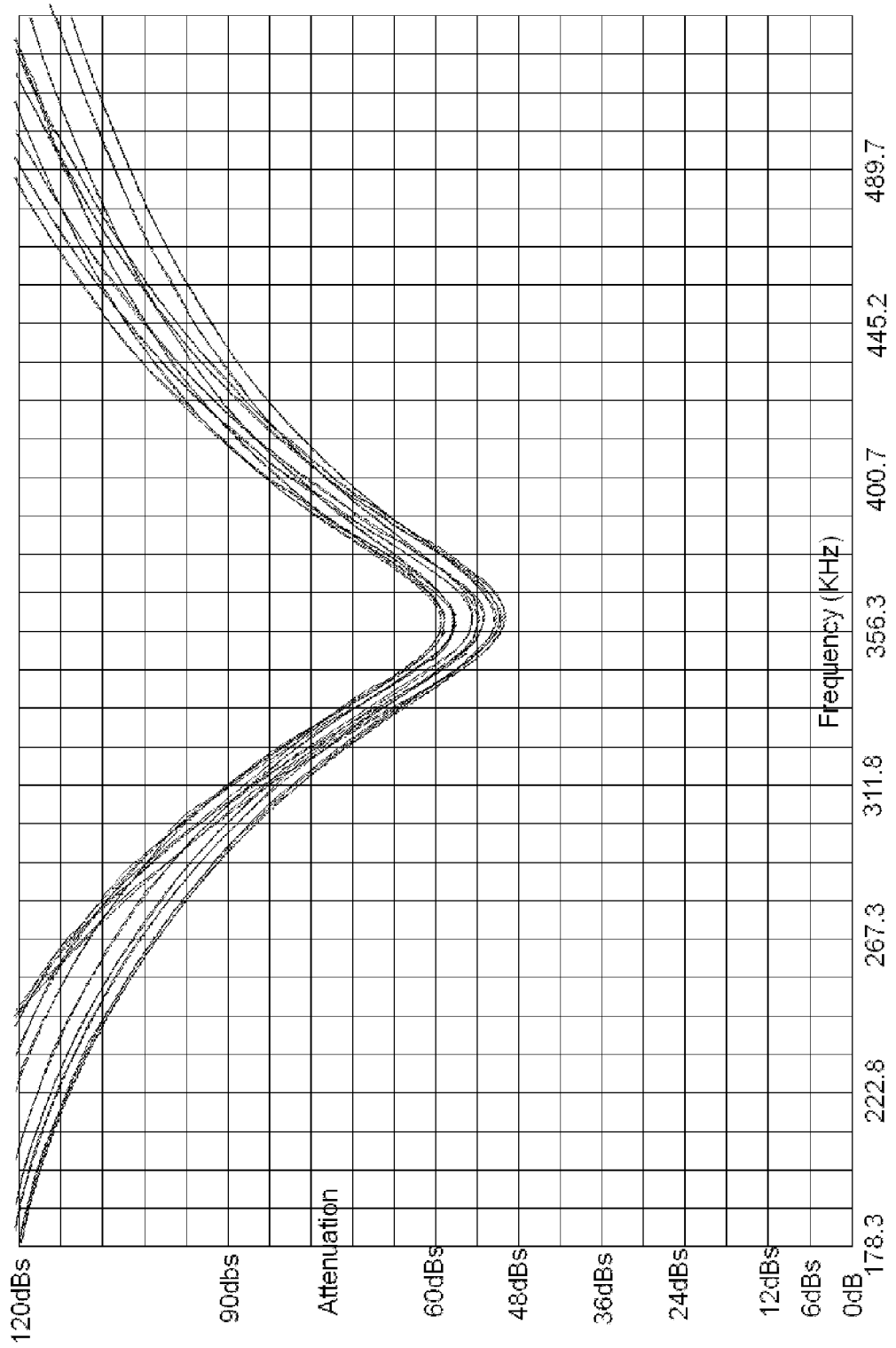

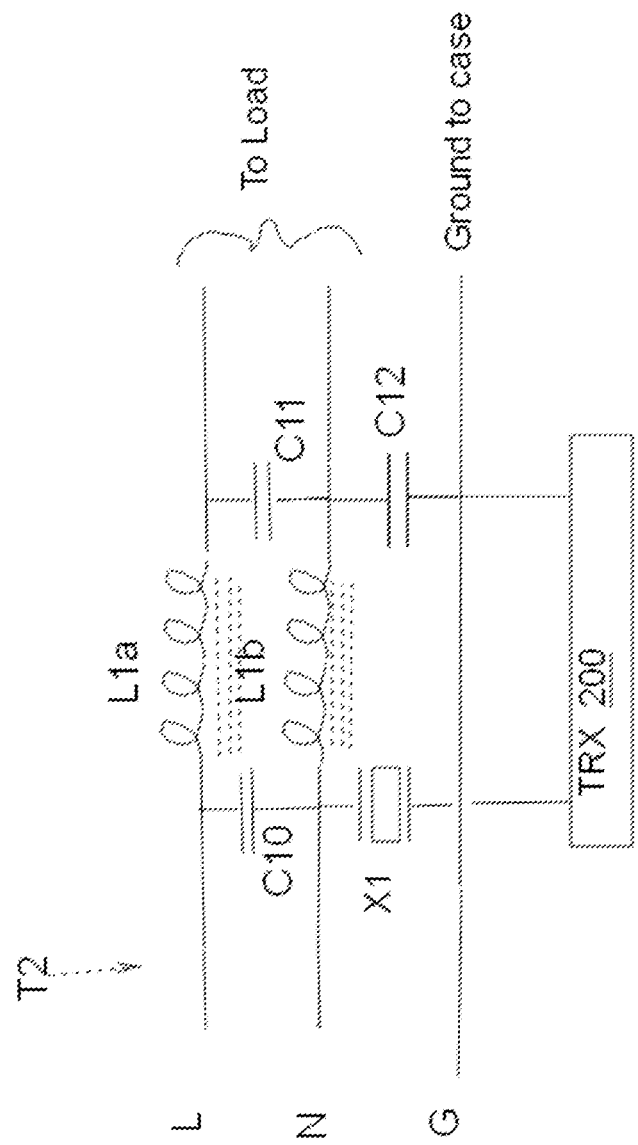
FIGURE 21: ALTERNATIVE COMMUNICATIONS SIGNAL COUPLING CIRCUIT

SMART APPLIANCES

BACKGROUND

The present invention relates to efficient use of intermittent renewable energy sources such as photovoltaic solar power.

From time to time in technological development circles new terms and phrases may come into use before the full extent of their possible meaning has been generally agreed. For example, the term ISDN (Integrated Services Delivery Network) was at one time coined to describe the possible technological future of the public telephone system. After many years, no developments under the ISDN banner had succeeded In capturing the imagination, leading to ISDN cynically being dubbed "I Still Don't Know". ISDN has now been totally overtaken and obsoleted by IP routing and the Internet.

In the current decade, the term "The Smart Grid" has come into use to describe the future of the electricity network. The term seems most often to imply making the electricity grid able to accept a higher fraction of intermittent renewable energy sources such as wind and solar, but what that might do for the average homeowner is still a mystery, with many cynically predicting that tariffs for energy usage will increase as a result.

Likewise, the term "Smart Appliances" has recently come into use. As there is a great variety of electrical appliances, it may be difficult to ascribe a general meaning to, or behavior that would characterize a "Smart Appliance". One feature of a "Smart Appliance" could be that it automatically adapted to the availability of power of different types or tariffs in order to minimize energy consumption or cost, which seems to imply communication between the power sources and the Smart Appliance.

Communication with Smart Appliances by means of a data cable would require additional house wiring; therefore it may be concluded that such data communication should preferably be wireless, using, for example, Bluetooth, Zigbee or WiFi standards. However, in order to route power of a selected type to a Smart Appliance, the power installation needs to know to which breaker circuit the appliance is connected, which is not provided by existing wireless or wired methods. Therefore there is a need for a method of identifying the electrical circuit to which an appliance is connected; a need to define the features of a Smart Appliance and its interaction with "the Smart Grid" that could be of general interest and benefit to a user and which a wide variety of advanced electrical appliances could be designed to possess, and to devise some novel methods and systems for constructing, controlling and communicating with the same that provides new and tangible benefits.

SUMMARY

In an electrical installation comprising a Smart Power Distribution Unit for distributing power to a number of circuits or outlets by wires protected by associated Over-Current Protection Devices, a method and system for automatically communicating with or among the Smart Appliances determines the circuit or outlet to which a Smart Appliance is connected, thereby enabling the Smart Power Distribution Unit to route chosen types of power to the Smart Appliance. The Smart Power Distribution Unit is also able to communicate information to and from the Smart Appliance to affect its operation, such as when or how it performs its intended task.

In one implementation, the method and system for communicating comprises using the power distribution wires of each circuit, which include live, neutral and ground wires, to transmit and receive digital data by modulation of a carrier frequency signal. The carrier frequency signal may be coupled to the power distribution wires by using, for example, a magnetic coupling device or transformer at each Smart Appliance through which at least one of the live and neutral power leads but not the ground lead pass in order to constitute at least a single-turn primary winding of a communications signal coupling inductor.

In a preferred implementation the magnetic coupling device is a ferrite toroid having a multi-turn secondary winding which is resonated with a capacitor to the carrier signal frequency to form a first tuned circuit. A similar or identical arrangement is employed in the Smart Power Distribution Unit to couple to the wire run to the outlet into which the smart Appliance is plugged. After the neutral wire has passed through the magnetic coupling device, it may be decoupled to the ground wire if necessary with a capacitor having a high impedance at the power line frequency and a low impedance at the carrier frequency so that a coupling loop comprising the ground wire and at least the neutral wire is formed at the carrier frequency, the coupling loop thereby coupling data modulated signals at the carrier signal frequency between the tuned circuits at each end of the wire run.

The carrier frequency signal is modulated with data to be conveyed between the Smart Power Distribution Unit and the Smart Appliance using any suitable modulation technique, such as digital frequency modulation (FSK), the carrier frequency signal then being demodulated to extract the data. Preferably a constant envelope modulation such as a variation of Frequency Shift Keying or Phase Shift Keying is used with a hard-limiting receiver.

A Time Duplex or Ping Pong communications protocol (TDMA) may be used to transmit bursts of digital data modulated carrier frequency signals alternately in each direction. The Time Duplex format may include multiple time-slots for each transmission direction to allow appliances on different breaker circuits to be polled sequentially. The Time Duplex format may furthermore comprise a frame pattern in which different slots carry different types of data as in a TDMA cellular telephone system such as GSM or IS54, for purposes which can include initially establishing communication with a new device for the first time; allocating time slots for future communication; allocating addresses for future communication; establishing the type or class of an appliance connected to the Smart Power Distribution Unit; establishing the location of a Smart Appliance in terms of by which power circuit the appliance is powered or into which outlet the appliance is plugged; performing a location update operation should an appliance be unplugged from one location and plugged into a different location and exchanging data pertinent to the operation of the Smart Appliance, the electrical installation, an alternative energy source or the Smart Grid.

Each digital data burst can comprise a synchronization pattern, an address for the unit for which the data is intended, and data to control the behavior of the destination unit. Alternatively the data may be an inquiry or "CQ call" to determine what appliances are on a given breaker circuit. Signal clashes between different Appliances trying to transmit at the same time on the same carrier signal frequency may be avoided either by allocating them different time slots, allowing transmission only in response to an interrogatory message from the Smart Power Distribution Unit or by use of Carrier Sense Multiple Access (CSMA), or a combination of these methods.

In a typical installation and application, the Smart Power Distribution Unit can have multiple sources of electrical power, such as grid power and solar power, that it can direct to the breaker circuit to which any given Smart Appliance is connected. The communications method and apparatus of the invention reveals the breaker circuit to which any given appliance is connected, and thus if an appliance is unplugged from one outlet and plugged into a different outlet on a different circuit, this can be detected and the Smart Power Distribution unit will still know on what breaker circuit it should direct power of a selectable type to that appliance.

One common characteristic of a Smart Appliance according to the invention may thus be summarized as an appliance that communicates with a Smart Power Distribution Unit, thereby jointly to minimize energy consumption or cost, a prerequisite for achieving this objective most effectively being to automatically establish to which of the power circuits served by a Smart Power Distribution Unit the Smart Appliance is connected.

BRIEF DESCRIPTION OF THE DRAWINGS

FIG. 1 illustrates a circuit arrangement for communicating among Smart Appliances FIG. 2 shows more detail of a Smart Power Distribution Unit FIG. 3 shows communications signal coupling for a 240-volt circuit.

FIG. 4 shows a chain of communication from a utility company to Smart Appliances.

FIG. 5 shows a possible Time Division Multiple Access frame format

FIG. 6 shows a possible circuit for modulating and demodulating digital data

FIG. 7 shows a new type of circuit breaker

FIG. 8 shows a new type of power inlet connector for Smart Appliances.

FIG. 8A shows a circuit for the new type of power inlet filter of FIG. 8

FIG. 9 shows Smart Appliances that may exist in a residential installation

FIG. 10 shows the circuit used for analyzing transmission frequency responses

FIG. 11 shows wide range frequency response for short lines and no damping

FIG. 12 shows wide range frequency response for long lines and no damping

FIG. 13 shows passband frequency response for short lines and no damping

FIG. 14 shows passband frequency response for long lines and no damping

FIG. 15 shows wide range frequency response for long lines with damping

FIG. 16 shows passband frequency response for short lines with damping

FIG. 17 shows passband frequency response for long lines with damping

FIG. 18 shows passband frequency response with lower Q circuits

FIG. 19 shows the transmission attenuation for five appliances plugged into the same breaker circuit.

FIG. 20 shows the transmission attenuation for ten appliances plugged into the same breaker circuit FIG. 21 shows an alternative communications signal coupling circuit

DETAILED DESCRIPTION

FIG. 2 shows the internal arrangement of a Smart Power Distribution Unit, also called a "Smart Load Center", as is described in U.S. patent application Ser. No. 14/062,884 to current inventor, filed Oct. 24, 2013 and entitled "Solar Energy Conversion and Utilization System", which is a Continuation of granted U.S. patent application Ser. No. 13/103,070 filed May 8, 2011, now issued on Jan. 20, 2015 as U.S. Pat. No. 8,937,822.

The above Applications and the '822 Patent are hereby incorporated by reference herein in their entirety.

The device referred to herein as a "Smart Power Distribution Unit" and which is referred to in the above-incorporated Applications and Patent as a "Smart load Center" is a new device in a class of devices which may in the prior art also be known by various other names such as a breaker box, Load Center or sub-panel. In general, the conjunction of the adjective "Smart" with any of these terms is meant to signify that the device is provided with some new capability or intelligent behavior beyond that typically found in conventional or "non-smart" devices. Likewise the term "Smart Appliance" signifies a household electrical appliance with some new and useful behavior. The term "Smart Appliance" can also be generalized to include the Smart Load Center/Smart Power Distribution Unit by regarding these also as forms of permanently installed household electrical appliances. The term "Smart Appliance" may also be generalized to include other permanently installed devices, such as elements in a solar energy installation, i.e. smart DC-to-AC inverters, smart photovoltaic string combiners and smart battery charge controllers. The meaning of the term may also be extended to include smart electric utility meters that measure consumption for billing purposes and report consumption to the electric utility company, or automatically receive time-of-day based tariff changes from the utility company. Thus communication between Smart Appliances and a Smart Power Distribution Unit can also be regarded as communication among Smart Appliances, and vice-versa. In general, the invention to be described can be used for communication between any such generalized Smart Appliances when such communication is of interest.

In FIG. 2, which illustrates the Smart Load Center disclosed in the above-incorporated '822 patent, it may be seen that, in contrast to the two power busses that normally extend down the center of a conventional breaker panel and into which the circuit breakers are connected, there are now four power bussbars—two for solar power or other alternative energy source and two for utility grid power or other primary energy source. Quadruple bussbar 3009 is sized to handle at least 60 amps on each solar input lug L1 and L2 (3001) and at least 60 amps on each utility power input lug L1 and L2 (3002). The panel of FIG. 2 is typically installed as a sub-panel and fed from the main service panel through a 60 A or 100 A, two-pole feeder breaker. The solar input may be derived from a solar DC to AC load inverter 1000 which is already electronically current limited. Single Pole, Double Throw (SPDT) relays 3003 are used to select power to each pole of each breaker either from one of the solar power bussbars or from a utility power bussbar. On each side, the breakers alternate between using L1 and L2, so that a pair of adjacent slots may be used for a double pole (240-volt) circuit such as needed for a well pump or tumble dryer. Each relay is controlled by a microprocessor which is not shown, but its functions are described in more detail in the above-incorporated Applications and will be expanded further later when describing FIG. 6.

The source of power selected by each relay 3003 is routed to its associated breaker through a toroidal core 3008 upon which a secondary is wound to provide a current sensor for each circuit. As will become evident from the description of the invention herein, the same or similar toroidal core can be used to inject or extract digital data modulated carrier frequency signals to/from the power wire or wires passing through the core, the data being transmitted to or received from a Smart Appliance on that breaker circuit.

An alternative method of injecting or extracting carrier frequency control signals to/from each breaker circuit uses a separate toroidal core, in the manner described with the aid of FIG. 1.

A US 120-volt appliance is plugged into a 120-volt outlet fed from a single pole Overcurrent Protection Device (OCPD) using a 3-conductor cable (100) comprising Live (L, Black), Neutral (N, White) and Ground (bare copper or Green) conductors. The OCPD is most commonly a circuit breaker these days, but in older installations may still be a fuse. The terms "breaker" and "breaker circuit" will hereinafter be used to refer to the OCPD of whatever type it is, and the wiring circuit it protects, respectively. The 3-conductor cable may feed a series of 120-volt outlets, which are connected in parallel, from the same breaker. Typically, a 3-conductor cable with the trade name ROMEX™ is used for wiring residential installations, while commercial installations are wired by pulling individual conductors through metallic conduit.

FIG. 1 shows only one Smart Appliance (400) which is assumed to be plugged into a single outlet. The case where other Smart Appliances are plugged into other outlets on the same circuit will be analyzed later.

For a 120-volt circuit, Power Distribution Box (300) contains a single-pole breaker which may be of one of three types: (1) Current overload trip only; (2) Current Overload and Ground-Fault Trip (GFCI breaker) or (3), Current overload and Arc Fault trip (AFCI or Combi breaker). A circuit breaker of type 1 has only a single output connection to which the live (black) conductor of cable (100) is attached. GFCI and AFCI breakers on the other hand have connections for both the live and neutral wires, and have a "pigtail" for connecting the breaker to the neutral bussbar. Either way, the neutral wire finds its way to a neutral bussbar inside Power Distribution Box (300), either directly, or though an AFCI or GFCI breaker. Moreover, the neutral wire ultimately finds its way to ground back at the service entrance, which is the only place it may be grounded.

According to one implementation of the invention, the Live and Neutral wires of cable (100) at Power Distribution Box (300) pass through a toroid or other magnetic transformer-like component. labeled T2. When a wire passes through a hole in a closed magnetic circuit such as a ferrite toroid, it constitutes a winding of a single turn, which may be regarded as a primary winding. In one implementation, T2 also has a secondary winding which may consist of a larger number of turns, for example 10-100 turns. The inductance of the secondary winding is chosen to resonate with a suitable capacitor value (labeled C4) at a selected carrier signal frequency. A suitable carrier frequency should be chosen such that it is not likely to interfere with other devices. For example, the 455 KHz Intermediate Frequency of AM radios, the 500 KHz emergency frequency and the 10.7 MHz intermediate frequency of FM radios should be avoided, as well as their operating frequencies in the medium wave and VHF bands. Prior art power-line communications devices use other frequencies in the 86-130 KHz region, which may also be avoided, but they operate somewhat differently in that they envisage coupling the signal between live and neutral rather than neutral and ground, which requires a lot more signal power, due to being loaded by the 60 Hz loads. A possible non-interfering frequency range considered here is 300-400 KHz, but other discrete frequencies such as 520 KHz or 13.5 MHz may be used, depending on the analysis of signal propagation through the premises wiring.

A similar arrangement at the appliance (400) comprises T1 and C2, which are tuned to the same frequency as T2 and C4. From FIG. 1 it can be seen that, if ground were effectively shorted to neutral by C3 and C1, then the neutral and ground wires would form a closed single turn coupling loop passing through both T1 and T2 and thereby coupling signal from one to the other. When the Q-factor of the resonance of T1 with C2 and T2 with C4 is large, it requires very little coupling between T1 and T2 to couple the entire signal with low loss from the Power Distribution Box end to the appliance end and vice-versa. For example, if the Q-factor is 20, a coupling factor of only 1/20, called critical coupling, is all that is required for complete signal transfer. This would form a critically-coupled double tuned circuit with a relatively flat frequency response and −3 dB bandwidth equal to the carrier frequency times $\sqrt{2}/20$. Moreover, the signal transmission method of FIG. 1 has the advantage that the signal path is not loaded with the 60 Hz loads, such as light-bulb filaments. Frequency analysis including the effects of the house wiring however show that attempting to engineer critically-coupled doubled tuned circuits is too dependent on the lengths of house wiring. An approach that is more robust to varying wire lengths and the likelihood of several smart appliances tee'd off the same outlet chain involves the use of damping resistors, as will be described.

While there exist appliances that may not use a ground wire, such as table lamps, it is envisaged that any Smart Appliance wishing to take advantage of the invention can be required to have a ground wire. Older wiring standards that allowed non-grounded, two-pole outlets are now obsolete and can be discounted.

In order to provide the desired closed coupling loop comprising the neutral and ground wires, C1 and C3 could be chosen to have low impedances, approaching a short circuit, at the carrier signal frequency. A true short circuit may not be used as it is only permissible to connect neutral to ground at one place, which is back at the utility service entrance. If ground and neutral were connected together at a second place, then return current flow would split in an indeterminate manner between the neutral and ground conductors. One of the problems that this causes is confusion of GFCI breakers that rely on the current on the live and neutral wires normally being exactly balanced. A discrepancy of as little as 6 milliamps between the live and neutral currents signifies a ground fault and will trip a GFCI breaker to protect personnel from shock. Therefore while C1 and C3 must have low impedance at the carrier signal frequency, they must have non-zero impedance at the line frequency. The impedance at the line frequency should be such as to ensure that a current somewhat less than 6 mA is the maximum that could ever be diverted from the neutral wire to ground. The impedance of C1 and C3 in series (or alone) appears in parallel with the impedance of the neutral wire and thus the fraction of current diverted can be computed if the neutral wire impedance is known. Residential wiring employs wire of at least 14 AWG which has a resistance of 0.00829 ohms/meter. Assuming a 100 meter run length gives a neutral wire resistance of 0.8 ohms which would imply a voltage drop on both the live and neutral wires of 16 volts each at a current of 20 amps. An additional limitation however, newly strengthened in the most recent National Electrical Code, is that voltage drop on wire runs should not exceed 5%, that is 6 volts, or 3 volts per Live or Neutral wire, which is to be achieved by using larger gauge wire for runs over 50 feet. A 50-foot run of 14 AWG would have a resistance of 0.127 ohms per conductor giving only a 2.54 volt drop along the neutral wire at 20 amps. Another mitigating factor is that the Smart Power Distribution Box (300) is intended to be placed near the center of the cluster of outlets it serves in order to reduce the mean length of wire runs and therefore copper and installation cost. Therefore for the purposes of determining the maximum permissible values for C1 and C3 it will be assumed that the voltage drop along the neutral wire of cable (100) is not more than 3 volts. C1 and C3 then should each have an impedance of greater than 500 ohms in order not to divert more than 6 mA from neutral to ground. A value of ten times this, or 5000 ohms, might be chosen to provide an order of magnitude margin and to allow for a few Smart Appliances being plugged into the same breaker circuit. This equates to a capacitor value of 53 nF, which has an impedance of 5.8 ohms at the highest carrier frequency considered of 520 KHz. A standard capacitor value of 47 nF could be used.

Further analysis of signal transmission will show that an even smaller value of C1 can suffice, and that it is useful to include a series resistance to damp spurious resonances that arise in house wiring of indeterminate length. C3 may usually be omitted due to the neutral and ground wires being connected at the main service entrance upstream of Power Distribution box (300). If C3 is connected ahead of a GFCI breaker however, it is not so limited in permissible value. For example, a 1 uF capacitor could be used if the length of the feeder run to the service entrance presented an excessive impedance at the carrier signal frequency.

In the circuit of FIG. 1, current at the power line frequency flows equally and in opposite directions on the Live and Neutral wires and thus cancels in the secondaries of T1 and T2. Even if this were not the case, the carrier signal frequency is envisaged to be sufficiently well separated from the power line frequency to avoid interference. The principle benefit of the power line flux cancellation obtained by passing both live and neutral through the magnetic circuit is, however, to avoid the chance of periodic flux saturation of the magnetic core by power line currents, which can be large values such as 20 amps, and which could potentially cause undesirable amplitude-modulation of the carrier signal at a frequency of 120 Hz. It also avoids creating a second coupling loop comprising the live and neutral wires between which 60 Hz loads are connected, this second loop having an indeterminate effect on the carrier frequency signal due to the indeterminate nature of unspecified 60 Hz loads.

When a 240 volt appliance is used in the US, it is fed by two out-of-phase 120-volt wires (called split phase operation) that have 240 volts between them, but only 120 volts each to ground. If the current on each 120-volt line is equal and opposite, there would be no neutral current; however some appliances, such as tumble dryers and electric ovens, may connect extra components, such as an internal light, between one 120-volt leg and neutral, so that the neutral current is not then zero. In the past, the neutral wire was permitted to serve as a ground wire for a tumble dryer, but due to the non-zero neutral current, there was a potential shock hazard from the case of the dryer if the neutral connection were lost; therefore it is no longer permitted by the electrical code to use the neutral wire as the ground wire for any appliance, and such an arrangement will not be permitted in future Smart Appliances. A future, 240 volt, Smart Tumble Dryer must therefore use a 4-wire connection comprising L1, L2, neutral and ground. It is then the sum of the currents on the two 120-volt hotlegs L1,L2 and the neutral current that is zero. In order to provide the same power-line frequency flux cancellation in the magnetic core therefore, all three wires (L1, L2 and neutral) should pass through the core as shown in FIG. 3. This also avoids the power line loads being coupled into the carrier frequency signal path.

In FIG. 3, cable (101) carries the two anti-phase hotlegs L1 and L2, usually on red and black wires, the neutral being on a white wire and ground being a bare copper or green wire. A plug-in Smart Appliance (410) such as a tumble dryer may be connected by 4-pin plug and outlet combination (401). A fixed water heater is generally not plug-in, but rather hard-wired, and may not normally need the neutral wire if it needs only 240 volts and not also 120 volts. Nevertheless, it is envisaged that a Smart Water Heater would use a cable with a neutral wire for the purpose of transmitting and receiving data communications according to this invention, in order to avoid connecting capacitors C1 and C3 from a live conductor. to ground, which is not permitted under European electrical codes and should be avoided in the US also. In industrial 3-phase applications or European residential installations using 3-phase appliances having three hot legs L1,L2 and L3, the three hot wires L1,L2 and L3 plus neutral may all be passed through the magnetic circuit in order to preserve power frequency flux cancellation. In order to allow 120/240 v breaker panels to host one or two pole breakers in any slot, the communications signal coupling toroid is threaded on installation with the live wire(s) leading to the breaker and the and neutral wire(s) connecting to the neutral bus on the appliance side of the breaker.

FIG. 10 shows the circuit used for analyzing transmission frequency responses. Power distribution unit (300) contains a first tuned circuit (L1,C1,R1) resonant at the selected carrier frequency, and the neutral and the live wires pass through the magnetic circuit of L1 to form a coupling loop with ground as the return. The neutral, live and ground wires continue through the house wiring to feed outlets that lie at various distances from unit 300. A first outlet feeding an appliance at the greatest distance from unit 300 feeds Smart Appliance Appliance (400-1). The appliance cord plugs into the outlet and picks up the ground, neutral and live wires. A 6' appliance cord length was assumed in the calculation. Internal to Appliance 400-1, the neutral and live wires pass through the magnetic circuit of another tuned circuit which may be formed from components of the same values L1,C1, R1 as those in unit 300. The neutral is then connected to ground via coupling capacitor dC in series with damping resistor Rs.

To the left of the first appliance, there may be another outlet into which a prior-art appliance is plugged. It may have a filtered power inlet connector of prior art unsafe type having capacitors from live and neutral to ground. The value of such capacitors is typically 2200 pF. The filtered power inlet connector typically also has series chokes on the live and neutral wires having inductances in the 100 uH-300 uH region. The impedance Yterm that such a filter presents from live+neutral to ground will therefore be modeled as a 150 uH inductor in series with a 4400 pF capacitor.

FIGS. 11 to 14 show overlayed frequency responses of the circuit of FIG. 10 calculated for transmission from unit 300 to appliance 400-1 and 400-2 respectively. The component values used for this calculation were Turns ratio N=2 L1=200 uH C1=1000 pF R1=4 Kohms dC=47 nF Rs=0

Two sets of line lengths were used:

Short lines: Length 0=5'; Length 1=2'; Length 2=3'; Length 3=5'

Long Lines: Length 0=10'; Length 1=20'; Length 2=30'; Length 3=50'

FIG. 11 shows the frequency response over the range 2 KHz to 2 MHz approximately for the short line length case for damping resistor Rs=0 It can be seen that there are some significant spurious resonances above the wanted passband centered at 345 KHz, at around 750 KHz and 1350 KHz.

FIG. 12 shows the wide-range frequency response for the long line case. Increasing the wiring lengths made one of the spurious resonances fall below the wanted passband frequency and now appears at about 240 KHz. This indicates that at some line length, the spurious resonance could coincide with the wanted passband center frequency and thereby distort transmission.

FIG. 13 shows the frequency response around the wanted carrier signal frequency of 346 KHz for the above short line length case. The frequency responses from unit 300 to either appliance or vice versa are substantially identical and the passband is reasonable flat.

FIG. 14 now shows the frequency response around the passband for the long line length case. The main observation is that the passband has shifted up in frequency so that a signal at the desired frequency of 345 KHz would be out of the passband.

FIGS. 11-14 thus illustrate that, without damping spurious resonances resulting from house wiring, variations in the length of the house wiring produce undesirably large changes in the transmission frequency response. Since the signal coupling circuits are passive, they are reciprocal, and the frequency responses for the reverse direction of transmission are identical.

FIG. 15 shows the wide range frequency responses for the long line length case when the damping resistor Rs is equal to 47 ohms, illustrating that the spurious resonances have gone. Moreover, the coupling capacitor dC was able to be reduced to from 47 nF to 10 nF.

FIG. 16 shows the passband shape for the short line case with damping. Instead of a critically-coupled double-tuned response, the response with the resistive coupling provided by the damping resistor Rs is substantially that of cascaded single tuned circuits, which has a more favorable group delay characteristic suitable for digital FM. FIG. 17 shows the passband response for the long line case with damping. It is seen to be substantially unchanged as compared with the short line case. Thus the introduction of the damping resistor Rs has rendered the transmission frequency response shape substantially independent of the length of house wiring runs.

The 6 dB bandwidth evidenced in FIG. 17 is about 20 KHz, which will support FSM, MSK or GMSK modulations in the range 9.6 KB/s to 25 KB/s, depending on the sophistication of the demodulator. As domestic appliances are very cost-sensitive, the receiver should be a simple as possible, suggesting using the lower bitrate figure with non-coherent FSK or MSK.

If a higher bitrate is desired, the bandwidth may be increased by lowering the Q of the tuned circuits. For example, reducing R1 from 8 Kohms to 4 Kohms produces the passband of FIG. 18, which has a −6 dB bandwidth of about 33 KHz, easily supporting 19.2 KB/s FSK modulation with binary data.

FIGS. 16.17 and 18 were computed for the case of two Smart Appliances plugged into the same breaker circuit. If the number of Smart Appliances plugged into the same breaker circuit is increased to five, the transmission responses are as shown in FIG. 19, and FIG. 20 shows the result for ten appliances. The only effect of loading more appliances on to the same breaker circuit is an increase in the transmission attenuation, from 35 dBs with two appliances in addition to unit 300, to the range 40-48 dBs with 5 appliances and the 50-59 dBs range for 10 appliances.

The amount of transmission attenuation that is acceptable depends on the transmit power and the resulting signal to noise ratio at the receiver. Referring to FIG. 4, if R1 is omitted and R2 is used to provide the same damping as a 4 Kohm value of R1, but at a 4:1 step-down tap on the secondary of T2, then the value of R2 would be 4 k/16 or 250 ohms. A 5 volt peak-to-peak logic signal at the carrier signal frequency would then imply an available transmit signal power of 5 mW or +7 dBm at the fundamental frequency into a 250 ohm load. The method of defining transmission attenuation in the above calculations results in a lossless circuit exhibiting 6 dB of attenuation; correcting for this results in a minimum received signal of +7 dBm−59 dbs+6 dbs=−46 dBm. This is still a very large signal from radio communications perspectives and way above thermal noise. Therefore providing that the prevailing neutral-to-ground noise environment of the electrical installation is less than −56 dBm in a 30 KHz bandwidth, there will be an adequate signal-to-noise ratio to provide a low digital data error rate. It is envisaged that both error correction coding and error detection coding will anyhow be employed to provide immunity to bit errors. Convolutional encoders for error correction are very simple to implement and hard-decision convolutional decoding can easily be performed in microprocessors at the low bitrates considered here. Error detection is envisaged to be by means of Cyclic Redundancy Check codes (CRC) over each data packet. The invention is not however limited by the choice or use of error correction and detection coding, and any or no coding may be used.

A number of possible uses of the communications link between a Smart Power Distribution Unit and Smart Appliances will now be outlined.

A Smart Appliance may convey data to the Smart Power Distribution Unit regarding its power consumption and the number of kilowatt hours needed to complete its operation by a given deadline. The Smart Power Distribution Unit may pass this data to the utility company to allow the utility company to schedule delivery. For example, an electric vehicle will most likely need to have its battery recharged at night when no solar power is being received, and the utility may offer a lower tariff in return for being permitted to determine when, before a given deadline, the requested number of kilowatt hours are delivered. When the Smart Appliance is for example a washing machine, the behavior to which the adjective "Smart" refers can be a similar deferred operation feature, whereby, after the user loads the washing machine and selects deferred run, its operation will be delayed until an indication is received from the Smart Power Distribution Unit. The Smart Power Distribution Unit might for example cause the appliance to run in dependence on the availability of free solar power or on the availability of reduced-tariff grid power. The indication of reduced tariff power may be received by the Smart Power Distribution Unit in real time from the utility company, either via the internet or via a smart electronic electricity meter that is in communication with the utility company by any means. Alternatively, power tariffs may change at predefined times of day which can be programmed in to the Smart Power Distribution Unit, which is envisaged to include a real-time clock.

Deferred operation may thus be useful for dishwashers, tumble dryers, electric vehicle chargers and suchlike. The Smart Power Distribution unit may indicate to such appliances to commence a deferred operation when, for example, free solar power is plentiful, as may be the case around midday, or alternatively when a reduced tariff for grid power applies, which may either be at a predetermined time of day or at any other time when the Smart Power Distribution Unit receives a low-tariff indication from a Smart Electric Utility Meter. A Smart Appliance may also allow the user to specify that it should preferably run only when low-cost power is available, but must complete its operation by a specified time at any cost.

When the Smart Appliance involves a temperature control device, such as a refrigerator, freezer, HVAC system, water heater or electric oven, the desirable "smart" behavior can comprise algorithms to minimize average energy consumption or cost. For example, a refrigerator can have an internal control circuit that normally aims to maintain an internal temperature of around +2 deg C., by turning on the compressor at +3 deg C. and turning it off at +1 deg C. The small 2 deg C. hysteresis ensures that the compressor does not switch on and off rapidly, which would increase wear and energy consumption. When however lower cost energy is available, a smart refrigerator can be designed to lower the off/on temperature thresholds to, for example, −1 deg C. and +1 deg C. respectively. Upon the energy returning to a more expensive tariff, the thresholds would return to normal, but it would take twice as long for the internal temperature to rise from −1 deg C. to +3 deg C. as to rise from +1 deg C. to +3 deg C., thereby delaying the use of the more expensive power.

A similar algorithm to the above can be used for HVAC systems. A building may be cooled to a temperature a degree or so lower when low tariff power is available than when a higher tariff applies, or heated to a degree or so warmer when a lower tariff applies than when a higher tariff applies. A water heater may be handled similarly. Such appliances may therefore adapt in real time to the time-varying nature of solar power as clouds move over, so that the delay in resuming use of more expensive utility power is sufficient to bridge the time between at least some solar obscuration events.

New Smart Appliances can be envisaged such as devices which store excess solar energy that is being received but not presently used. A larger storage battery bank is an obvious example, but one can also consider that a 600 gallon, well-lagged water tank can store enough heat to heat a home for 12 hours, and can be integrated into an HVAC system using a suitable heat exchanger, the water being heated with excess solar thermal or electric power and the heat being extracted later via the heat exchanger to keep a home warm during the nighttime hours. Storage heaters that use low-tariff electricity at certain times of day already exist using a similar principle. Such systems can constitute examples of new types of appliance that can be controlled in a "Smart" way by the Smart Power Distribution Unit.

Another new Smart Appliance that may be envisaged is simply a small, very low cost alphanumeric display, that receives data to display from the Smart Power Distribution Unit by plugging it into any outlet. Such a display may be plugged into any outlet with no special wiring required, it then identifies itself using the communications system described herein, revealing the circuit into which it is plugged to the Smart Power Distribution Unit, and displays the data that the User previously programmed that particular display to show. The data displayed may be any of Time-of-day; inside or outside temperatures (received from smart temperature sensors); weather information received over the internet via an Internet-connected Smart Power Distribution Box or from other smart sensors; actual power consumption of the house installation or any circuit of the house; amount of solar power being received; solar battery charge state; electric vehicle battery charge state, and so on. The user may select any of the items in the above list to be displayed cyclically on one or more displays in different rooms.

An HVAC system can be configured to receive control signals from the Smart Power Distribution Unit to control its operation, including data from the above-mentioned smart temperature sensors. A Smart power distribution unit can have an internal processor of sufficient capability to be configured with various standard software algorithms for performing alarm clock functions, display functions, temperature control functions, deferred operation functions and so on, as well as its normal function of managing the use of solar versus utility power. Thus it is possible to replace the function of electric clocks, barometers and thermostats and also eliminate the wiring previously required for thermostats. The Smart Power Distribution Unit may simply pass the temperature value from a Smart temperature sensor to a Smart HVAC system, or alternatively, because it is a universally required function, the Smart Power Distribution Unit can contain a software process to perform all the functions of a Thermostat, including allowing the User to set target temperatures, daytime and nighttime temperatures and so forth. It is also possible to include the power-line communications circuits described herein into PCs such they have an intrinsic ability to contribute their processing power to the electrical installation. This can provide an alternative to USB, RS232, WiFi, Bluetooth or Zigbee for communications between a User's PC and Smart Distribution Unit (300) and Smart Appliances (400), allowing it to act as the main Man-Machine Interface between the User and his Smart Appliances.

Thus, intelligent control strategies may be defined for a variety of appliances such as electric ovens, coffee makers, water heaters, computers and such like, with the common objective either of reducing average power consumption, reducing the average cost of power by the greatest amount possible, or displaying status and other data to the User anywhere in the house.

As described in the above-incorporated Applications, the Smart Power Distribution Unit of FIG. 2 may communicate with a photovoltaic solar power system, for example the DC-to-AC inverters, in order to receive information on the availability of solar power and/or the state of a solar-charged battery. An inverter that may be used in such a solar power system is also described in the above-incorporated Applications and Patent. A Smart Power Distribution Unit may also communicate with other Smart Power Distribution Units and a user's Personal Computer and hence to the Internet. Herein it was further disclosed that a Smart Power Distribution Unit may also communicate with suitably designed Smart Appliances and with a Smart Electricity Meter and hence to the utility company to whom the meter belongs. Thus a complete chain of communication may be created between the utility company that is furnishing grid power and the end-user's appliances, with the Smart Power Distribution Unit acting as a communications hub and protocol converter as necessary.

FIG. 4 illustrates the communications links between various entities. Smart Power Distribution Unit (300) comprises circuit breakers (301), ground bussbars (302), neutral bussbars (303) and microprocessor and communications electronic circuitry (304). Only components and wiring relevant to the communications links is shown, and significant items not shown are power feeders, other solar system components and the main service entrance panel which feeds unit (300) as a sub-panel.

Each breaker circuit can have an associated carrier frequency signal transformer T2 as shown in FIG. 1 (or FIG. 3 for 240-volt circuits and 2-pole breakers) which may be combined with its resonating capacitor C4 and optionally other components of TRX (201) of FIG. 1. The outputs of all signal transformers T2 are connected to microprocessor and communications circuits (304) where carrier frequency signals for transmission may be generated or received signals may be decoded. To reduce cost, one transmitter receiver TRX (201) may be multiplexed between all transformers T2 and used to communicate with one breaker circuit at a time such as that feeding chain of outlets (350). When circuit (304) communicates with one outlet chain, a multiplexer connects the associated breaker's transformer T2 to the TRX (201) and then circuit (304) generates a modulated carrier frequency signal bearing a digital data sequence and transmits it through the selected T2. If an appliance address is already known, the digital data sequence may include the address of an appliance (400) plugged into outlet chain (350) to indicate to the appliance that message bits are intended for it. The message may be an interrogatory message requesting a status or other data from appliance (400) or alternatively it may be a command to appliance (400) or may be providing data required by appliance (400). Since different appliances will likely provide different data and require different data, for maximum flexibility the meaning of the message bits and their formatting might be left to the appliance manufacturer to define and the appliance manufacturer may supply a program on CD to be loaded into PC (500) to handle control of his appliance or to configure circuits (304) to do so. On the other hand, it may alternatively be desirable to standardize data fields and formatting for a finite number of classes of appliances that can be envisaged, as has been done for Bluetooth communications. Both possibilities may also be provided, whereby circuits (304) can retain control of an appliance conforming to a predefined, known class while delegating control of a non-standard appliance to PC (500) using a custom, appliance-manufacturer supplied control program, circuits (304) in the latter case then acting merely as a data relay between the Smart Appliance and PC (500).

If the address or type of appliance is not already known, the address may be replaced by a reserved bit pattern that indicates that communications circuits (304) are requesting any appliance not yet registered to make itself known. This is referred to as a "service discovery". A new appliance making itself known would then be allocated a unique address for future communications. To prevent two or more new appliances replying simultaneously and clashing, a random delay before replying can be instituted together with use of Carrier Sense Multiple Access, whereby an appliance determines the carrier signal strength in a time slot and does not transmit in that time slot if it is already carrying a signal.

Periodically, every breaker circuit may be interrogated with a service discovery message to determine what is connected to that breaker circuit. In addition, appliances that are powered off and then powered up again can make their renewed presence known on the outlet chain into which they are plugged by transmitting an "active" message to circuits (304).

The procedure by which an appliance lets it be known that it has been moved from one outlet to another is analogous to the procedure called "location update" in cellular phone systems, which is used to determine from which tower a mobile phone is presently being served. In fact, many of the Mobility Management concepts of cellular telephone systems may be re-used in this application to solves similar issues.

A cellular wireless telephone system has a number of cellphones that move around from the service area of one base station to the service area of another base station. When a cellphone detects that a new base station provides a better signal, it compares a code broadcast by the new base station with a code broadcast by the previous base station to which is was locked, and if they differ, the cellphone performs a location update. This may involve transmitting a message to the old base station requesting a change or it may involve making a random access to the new base station, or both. This Mobility Management protocol is re-defined here in the context of Smart Appliances. When a Smart Appliance is first plugged into an outlet or powered up, the communications circuit of this invention may attempt to decode data broadcast by the Smart Power Distribution Unit (300) on a time slot called the Broadcast Control Channel (BCCH) which occurs repeatedly in consecutive Time Division Multiplex frames. Communications from the Smart Power Distribution Unit to Smart Appliances will be termed the Down link while communications from Smart Appliances to the Smart Power Distribution unit will be called the Uplink. The data decoded from the BCCH downlink slot can include an indication of the breaker circuit and the Smart Power Distribution Unit to which it is connected. If the decoded data indicates that it is not connected to the same circuit or Smart Power Distribution Unit as previously, then the Smart Appliance knows that it must make its presence known anew or for the first time on the new circuit. This it may do by transmitting a Random Access Message on the uplink timeslot corresponding to the downlink BCCH. The corresponding uplink slot is called the Random Access Channel or RACH for short. Before transmitting on the RACH, a Smart Appliance can measure the carrier signal strength on an RACH slot and transmit on the next RACH slot only if the measured signal strength on the previous slot was low. In the case that an independent Transmitter-Receiver is provided for more than one (or all) breaker circuits, the TDM frame format can be staggered on different breaker circuits such that the BCCH slot occurs at a different time on different circuits, thereby avoiding many signals being transmitted on the house wiring at the same time.

It may be mentioned at this point that automatically providing an indication of the breaker circuit into which a Smart Appliance is plugged may be accomplished by having only power line downlink communications that broadcast a circuit-specific code to be picked up by the Smart Appliance from the outlet into which it is plugged, the Smart Appliance then communicating the code back to the Power Distribution System by any means, including wireless transmission using for example WiFi, Bluetooth or Zigbee.

FIG. 5 shows a possible TDM frame format assuming that a single Transmitter-Receiver (TRX) is provided in the Smart Power Distribution Panel to be shared between 16 breaker circuits. Assuming a transmission symbol rate of 19.2 Kilobits per second, burst slot (6000) comprises 4 known guard bits at the beginning and end, a 24-bit sync word, start codon or mid-amble in the middle of the slot, bordered by two 64-bit data fields, The total of 128 bits in the data fields may be assigned as follows:

A 4-bit sub-panel (unit 300) ID for distinguishing up to 16 sub-panels in the same electrical installation;

a 4-bit breaker circuit ID for distinguishing up to 16 breaker circuits per sub-panel;

an 8 bit appliance address for distinguishing up to 256 appliances or identifying the slot as carrying special or broadcast data;

a 40-bit message ID field for conveying data 40 bits at a time to an addressed appliance an 8 bit CRC code The above 64 bits may then be subjected to a rate 1/2 tail biting convolutional code, doubling the total bit count to 128. The 128 bits may be interleaved alternately to the right half 64 of slot 6000 and the left half, if that provides an advantage against anticipated interference patterns.

16 slots (6000) may be transmitted in one direction followed by 16 slots transmitted in the other direction to form a frame (6001). Each of the 16 slots may be assigned to a give breaker circuit so that each of circuits receives a transmit slot assignment and a receive slot assignment. These assignments may be fixed or con=continuously varied according to the traffic demand.

Using the exemplary values above, there are 15 frame periods every 4 seconds. A superframe (6002) therefore contains 15 frame periods and repeats every 4 seconds. Frames in the superframe are numbered F0 to F14. One of these frames may be designated to be a broadcast control channel BCCH which is a downlink channel (unit 3090 to appliance) that contains data for controlling the allocation of slots to different appliances. The reverse direction equivalent of the BCCH frame is the Random Access Channel, which allows newly-connected appliances to identify themselves to unit (300) and to receive an address allocation unique to the system, and a slot assignment for further communication. The TDMA format of FIG. 5 is merely exemplary and there is much prior art in the field of digital cellular mobile phone systems that can be drawn upon to devise a suitable TDMA format that may differ from the exemplary format of FIG. 5 without departing from the spirit of the invention.

FIG. 4 illustrates the various communications links that can exist in a complete installation.

Communications link (501) between PC (500) and circuits (304) is logically one for which PC:s are already adapted, such as RS232, USB, WiFi or Bluetooth, but may alternatively be the power line communications system of this invention if the PC is equipped with a suitable protocol converter connected to the computer's power outlet. One way of equipping all PCs and many other appliances with this power line communications ability is to use a new type of filtered power inlet connector having in particular transformer T1 or T2 already included, as will be further described below.

Communications link (801) provides communication among the elements of a solar energy system, if installed, including other Smart Power Distribution Units (300) and DC to AC inverters (not shown). This protocol may be proprietary or of a different standard than the power line communications to the Smart Appliances.

Communications link (601) provides communication with a Smart Electronic Electricity Meter and may be hardwired, as neither the electricity meter nor unit (300) are expected to be moved, but rather are permanently installed. Communications link (701) between the Electricity Meter and the utility company may be proprietary to the utility company. It is up to Smart meter (700) to perform protocol conversion between links 601 and 701, and communications circuits (304) of unit (300) provide protocol conversion between links 501, 601, 801 and the power line communications protocol with Smart Appliances, as required. In addition, PC (500) may have an Internet connection, thus providing an alternative communications path to the utility company or with other services such as a solar information gathering and distributing server.

It has thus been described how a complete chain of communication can be formed from the utility company to an individual appliance if such provides benefit to both the utility company and the end user. It can also be regarded as extending the "Smart Grid" down to individual "Smart Homes" and even individual Smart Appliances.

A simplified circuit of TRX (200,201) for communicating data by modulated carrier frequency signals is shown in FIG. 6. Signal coupling transformer T2 may be a ferrite toroid of type Magnetics Inc 2206L which has an inner hole diameter sufficient to pass two or three 14 AWG or larger power wires. This toroid provides an inductance of about 200 uH with a 20 turn secondary. The secondary is resonated to the desired carrier signal frequency by choice of C4 in the region of 1000 pF (for a frequency of 345 KHz) and the Q-factor reduced to around 20 by choice of R1 in the region of 9.1 Kohms. Item (2001) is a 16-way analog multiplexer which may be formed by combining standard 8-way multiplexers such as a 74HC4051. This is needed only in the Smart Power Distribution Unit which communicates to many circuits, and not in a Smart Appliance, which communicates only to its own circuit. Transformer T2 may be coupled into multiplexer (2001) using a suitable tap on the secondary to obtain a convenient impedance. For example a tap at 5 turns gives an impedance level between 500 and 600 ohms. The multiplexer selects the tap on one transformer T2 to connect to demodulator (2002), which can based on a Philips FM radio chip type SA624. This chip has connections to a bandpass filter (2005) to suppress out-of-band interfering signals and to frequency discriminator coil (2004). The components described above are off the shelf and can be used to construct prototypes rapidly. Should the invention be adopted for large volume use, it would be possible to design a lower cost chip having far fewer external components to perform data demodulation and decoding. Demodulator (2005) provides a Radio Signal Strength Indication (RRSI) to processor (2003) which comprises an analog to digital converter. The RSSI signal allows processor 2003 to determine the transmission being received with the greatest signal strength, and thereby to determine the circuit it is plugged into from the unique, circuit-identifying code that is transmitted by the Smart Power Distribution Unit on every breaker circuit. Likewise the output of the frequency discriminator of circuit (2005) is connected to either a digital input, if it is first constrained to a binary signal by a slicer, or else to another analog to digital converter input. of the processor if soft-decision decoding will be used. Processor (2003) may record a signal burst in memory and then perform either hard or soft error correction and detection coding of the demodulated digital signal and then route the result elsewhere as required, or act on the result by operating power selection relays according to its pre-programmed algorithms.

Multiplexer (2001) can be set to select no input and is then effectively tri-stated. Transmit component (2006) may also have tristateable outputs each connected through a resistor R2 to the tap on a respective T2. When an output of transmit circuit 2006 is tristated, it allows received signals to pass to multiplexer 2001 unloaded by R2. Conversely, when no multiplexer input is selected, transmit circuit 2006 may deliver a signal at the carrier signal frequency to the tap on T2. If frequency modulation of the carrier frequency is used for data communication, the carrier frequency signal can be a logic level square wave of 5 volts peak to peak for example. Alternatively, transmit component 2006 can have non-tristateable logic-level outputs, and R2 becomes the damping resistor for establishing the receiving circuit Q factor, it then being possible to omit R1.

The system for communicating among Smart Appliances described above can be constructed in a fashion that allows existing installations to be upgraded. For example, a unit comprising the circuit of FIG. 6 can potentially be designed to fit within or next to an existing sub-panel, even though an existing sub-panel may lack the ability to route alternative power sources to the loads. Nevertheless, useful functions such as utility-tariff-based deferred operation, thermostat functions and power consumption monitoring and reporting to the User's PC can still be performed.

Another potential future realization of the invention can comprise building at least some of the circuitry of FIG. 6 into a new circuit breaker design. Consider that GFI breakers already include a transformer like transformer T2 of FIG. 1 or 3 for monitoring live/neutral current imbalance. It is therefore possible that a single such transformer could perform both the GFI function and the power line communications function. AFCI breakers even contain a digital signal processor that computes and detects spectral characteristics of the current on the Live wire that are associated with an arc fault. The monitoring of current on the Live wire can of course also be used to monitor power consumption on the circuit. Such a processor could therefore also be programmed to decode power line communications data. A new type of breaker can therefore be envisaged that uses these components to perform power line communications, and which can be told to be either a GFI breaker, an AFC breaker, a Combination of the two or just an Overcurrent Protection device by externally supplied programming bits. The new breaker would look somewhat like prior art breakers but, in addition to Live and Neutral terminals for the load circuit, it would have additional connections on the bottom surface for interfacing with a microprocessor bus to receive data for transmission or deliver received data. The new breaker could optionally have a ground terminal for the load circuit too, and a ground pigtail as well as a neutral pigtail to connect to respective busses. Optionally, pigtails could be replaced by ground and neutral stabs, in addition to the normal Live stab, as pigtails were only used to enable GFI and AFCI breakers to be plugged into existing panels. The new breaker would not be intended to fit existing panels and therefore its design need not be compromised.

A 5-pin communications interface could be envisaged for the new breaker design, comprising ground, enable, serial in, serial out and clock pins. The serial data input could set the breaker type (OCPD only, AFCI, GFCI or all of these) and its current limit, as well as latching data for transmission and assigning a timeslot for transmission. The serial out data could be read by the microprocessor to determine whether the breaker had tripped, the cause of the trip, and the circuit current or recent circuit current history. Such a circuit breaker is illustrated in FIG. 7. The new circuit breaker includes transformer T2 which samples current imbalance between Live and Neutral at the power line frequency as well as sampling the communications carrier frequency signal. The new breaker also includes T3, which samples power line current on the Live wire alone. Communications and current monitoring circuit (4003) processes the signal from T2 to determine if a ground fault exists and also to extract or inject the communications signal as previously herein described. Circuit 4003 also processes the live current sampled by T3 and delivers the digital current measurement to communications signal connector (4004). The live current is also processed to detect an arc fault or an overcurrent condition. The overcurrent limit can be programmed via communications connector 4004, and if the programmed limit is exceeded, or if an arc fault is detected, a signal is sent to electro-mechanical trip mechanism (4001) which rapidly disconnects the Live wire from Stab 4002 thereby removing power from the faulty circuit. Since processor power and memory are cheap with today's technology, circuit 4003 can include as much functionality as desired in terms of memorizing history of circuit current and voltage. Given in addition an AtoD converter for measuring the voltage between the Live and Neutral wires, it can for example compute 4-quadrant power consumption and power factor.

Another new component that can be envisaged to facilitate the integration of power-line communication functionality into appliances such as Personal Computers, washing machines or refrigerators is the power inlet connector shown in FIG. 8. This is intended to accept normal power leads as supplied with PCs, printer and the like, having the same size, shape and spacings for Live, Neutral and Ground pins (5001,5002,5003) as in the prior art, but now includes power-line communications coupling transformer T2 of FIG. 1 ahead of, as well as or instead of any other power line filtering. Moreover, the power line filtering would be changed as discussed in the above-incorporated Applications and the '822 patent from the unsafe circuit of FIG. 9A therein to the safe circuit of FIG. 9B therein. Moreover it can be seen that the common mode filter inductor in FIG. 9B is effectively connected the same way as transformer T1 of FIG. 1 of the present application, and that the capacitor from neutral to ground is connected as is C3 of figure. Therefore it is possible that the new connector of FIG. 8 would need no extra components internally as compared to the prior art, but now a secondary on the common mode filter choke is brought out on pins 5005 for connection to power line communications circuits, perhaps by printed circuit mounting. Otherwise the connector of FIG. 8 can be mechanically interchangeable, including any mounting holes in panel-mounting flange (5004) and length, width and height dimensions with existing power inlet connectors.

Alternatively, the new transformer T2 can be included explicitly as shown if FIG. 8A. In FIG. 8A, the live (L) and neutral (N) wires pass through toroid T2 and then neural is connected to ground via dC and Rs as previously described. The live and neutral wires continue through the EMI filter composed of C10, L1a, L1b, C11 and C12 as in the prion art as modified for safety reasons according to the teachings of the above-incorporated '822 patent. The secondary winding on T2 may be brought out to new pins on the connector for connection to the powerline communications transmitter-receiver TRX.

While much discussion has been devoted to signal coupling circuits using transformers such as T2 of FIGS. 1 and 8A, the invention is not necessarily limited only to that method of coupling communications signals into the power distribution wires. For example, an alternative method could be to connect a series resonant circuit, such a ceramic resonator, to the neutral line to pick off the carrier frequency signal for demodulation, as shown in FIG. 21. FIG. 21 shows the safe form of filtered power inlet connector comprising C10, L1a, L1b, C11 and C12 as before, but instead of T2, the signal coupling component is ceramic resonator X1 which has a low impedance series resonance at the carrier signal frequency. This couples carrier signals to the neutral wire with respect to ground from a low output impedance transmitter of TRX (200) and couples carrier signals from the neutral wire with respect to ground to low input impedance receive circuits of TRX (200).

While more than one coupling method may be devised to implement the invention, in practice the method adopted should conform to a standard so that appliances of different manufacture can be used in the same premises with predictable results. Thus each proposed method of coupling should be analyzed to determine the performance of itself and other appliances when appliances using different coupling methods are plugged into different outlets on the same breaker circuit.

FIG. 9 illustrates a number of Smart Appliances in a residential setting. Smart Power Distribution Unit (300) is the hub of the inventive power-line communications system for Smart Appliances as well as being the arbiter of which power source is used for which appliance. PC (500) may be equipped with the new form of power inlet connector shown in FIG. 8 that facilitates coupling communications signals on to the power cord. Whichever of outlets (350) (or other outlet not shown) it is plugged into, it will make its location known to the Unit (300) so that it can route data or power destined for PC 500 to the correct circuit. For example, if PC 500 is designated to have a high priority to receive power during a prolonged utility outage, then that priority will be assigned to the power circuit into which it is plugged at any time. If it moved to a different outlet, the new outlet circuit will now receive that priority.

Also shown in FIG. 9 is the now mandated 4-pin socket for tumble dryers (5011. A display (5012) to which Unit (300) has been requested to send selected data for display may be plugged into any outlet, and after performing the Mobility M, management operations described herein, Unit (300) will known on which breaker circuit to transmit the data.

Temperature sensor (5010) may be hardwired to the same circuit as any outlet chain such as 350, or else can be plugged into any outlet. It will likewise make its location known to Unit (300) which can then interrogate it periodically to receive the temperature and use the temperature to control the HVAC system. The HVAC system is in turn given commands along the power line communications medium without additional control wires having to be installed.

It has thus been described why an electrical installation having two or more energy sources that may be selected according to some criterion to be distributed to Smart Appliances must know to which electrical circuits those appliances are momentarily connected, and a method and apparatus has been disclosed that provides this information. General characteristics of a few classes of Smart Appliances have also been described that will provide valuable utility for the User including the potential for saving energy or energy cost, either by using alternative energy such as solar energy or by adapting to varying utility tariffs.

A person skilled in the art may use the teachings disclosed herein to make various modifications to detail or may configure a variety of systems, while remaining within the scope of the invention as described by the following claims

I claim:

1. A communications apparatus for communicating data between Smart Appliances comprising:

a modulator for modulating said data for communicating from a first of said Smart Appliances to a second of said Smart Appliances on to a carrier frequency signal;

a signal injection device for injecting at said first Smart Appliance said modulated carrier frequency signal on to a circuit comprising a first and a second conducting path, the first of said conducting paths comprising at least one live wire and a neutral wire, and the second conducting path comprising a ground wire, wherein the ground, live, and neutral wires connect said first and second appliances to a power circuit;

wherein said circuit comprised of said first and second conducting paths is completed at one end by the bonding of neutral to ground in a service entrance panel, and wherein the power line frequency impedance is high enough to avoid false triggering of a Ground Fault Circuit Interrupting breaker when a specified number of such Smart Appliances are plugged into the same breaker circuit;

a signal extraction device for extracting at said second Smart Appliance said injected modulated carrier frequency signal from said circuit comprised of said first and second conducting paths;

wherein each signal injection and extraction device comprises a closed magnetic circuit of magnetic material through which pass at least one live wire and the neutral wire feeding power to said respective Smart Appliance, to form a primary winding equivalent to at least one turn;

wherein each signal injection and extraction device further comprises a multi-turn secondary winding on the closed magnetic circuit, whereby the secondary winding is electrically isolated from the live and neutral wires, and is used to inject and extract, respectively, said modulated carrier frequency signal; and a demodulator for demodulating and decoding said extracted modulated carrier frequency signal to obtain said data at said second Smart Appliance.

2. The communications apparatus of claim 1 in which said first or second Smart Appliance is a Smart Power Distribution Unit for feeding power to other Smart Appliances and electrical outlets or circuits.

3. The communications apparatus of claim 1 in which said modulator is a Frequency Shift Keying (FSK) modulator.

4. The communications apparatus of claim 1 in which said multi-turn secondary winding is tuned to resonance by a capacitor at said carrier signal frequency.

5. The communications apparatus of claim 1 in which said signal injection device can also be used for signal extraction, and in which said signal extraction device can also be used for signal injection, to communicate data in the reverse direction from said second Smart Appliance to said First Appliance.

6. The communications apparatus of claim 1 in which said modulator modulates data on to said carrier frequency signal and which causes the modulated carrier frequency signal to be injected by said signal injection device in to said circuit comprised of said first and second conducting paths in an assigned transmit timeslot of a recurring Time Division Multiplex frame period.

7. The communications apparatus of claim 1 in which said demodulator causes said signal extraction device to extract said modulated carrier frequency signal from said circuit comprised of said first and second conducting paths in an assigned receive timeslot of a recurring Time Division Multiplex frame period.

8. The communications apparatus of claim 1 in which said data for communicating from the first of said Smart Appliances to the second of said Smart Appliances comprise data unique to each separate electrical circuit formed by separate first and second conducting paths, said unique data identifying the electrical circuit to which the first and the second Smart Appliances are connected.

9. The communications apparatus of claim 1, wherein said communication apparatus is disposed in a Smart Power Distribution Unit for communicating with a Smart Appliance, and further comprising:
- input terminals for accepting power from at least one power source including Live, Neutral and Ground terminals;
- at least one circuit breaker for coupling power from said input terminals to an associated power output circuit, the power output circuit comprising the live, neutral, and ground wires; and
- wherein said data communicated by said communications apparatus comprises an indication of which of said at least one circuit breakers is feeding said power output circuit.

10. The communications apparatus of claim 1, wherein said communication apparatus is disposed in a Smart Appliance for taking advantage of energy of lower cost when available from a power source, and further comprising:
- a user interface for enabling the user to instruct said Smart Appliance to operate when said lower cost energy is available; and
- wherein said data communicated by said communications apparatus comprises an indication of the availability of said lower cost energy, the indication being used to initiate said operation instructed by the user using said user interface.

11. The communications apparatus of claim 10, in which said decoder is further configured to decode a signal conveyed via said power line ground, neutral and live conductors to obtain an indication that identifies an electrical power circuit to which said appliance is connected and retransmitting said decoded indication to said power source, thereby enabling said power source to route said lower cost energy to said Smart Appliance using said identified electrical power circuit.

12. The communications apparatus of claim 10 in which said lower cost energy is utility grid power available at a reduced tariff at off-peak times of day.

13. The communications apparatus of claim 10 in which said lower cost energy is solar energy.

* * * * *